US012750868B2

(12) United States Patent
Hou et al.

(10) Patent No.: US 12,750,868 B2
(45) Date of Patent: Sep. 29, 2026

(54) MANAGEMENT ELECTRONIC DEVICE AND METHOD FOR WIRELESS COMMUNICATION, AND MEMBER ELECTRONIC DEVICE AND METHOD FOR WIRELESS COMMUNICATION

(71) Applicant: Sony Group Corporation, Tokyo (JP)

(72) Inventors: Yanzhao Hou, Beijing (CN); Xiaofeng Tao, Beijing (CN); Yinan Guo, Beijing (CN); Chengrui Wang, Beijing (CN); Yang Wen, Beijing (CN); Xiaoxue Wang, Beijing (CN); Chen Sun, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 339 days.

(21) Appl. No.: 18/576,373

(22) PCT Filed: Jul. 5, 2022

(86) PCT No.: PCT/CN2022/103836
§ 371 (c)(1),
(2) Date: Jan. 4, 2024

(87) PCT Pub. No.: WO2023/284586
PCT Pub. Date: Jan. 19, 2023

(65) Prior Publication Data

US 2024/0314815 A1 Sep. 19, 2024

(30) Foreign Application Priority Data

Jul. 14, 2021 (CN) ......................... 202110795144.0

(51) Int. Cl.
*H04W 72/30* (2023.01)
*H04W 72/0457* (2023.01)
*H04W 72/40* (2023.01)

(52) U.S. Cl.
CPC ....... *H04W 72/30* (2023.01); *H04W 72/0457* (2023.01); *H04W 72/40* (2023.01)

(58) Field of Classification Search
CPC ..................................................... H04W 72/30
See application file for complete search history.

(56) References Cited

U.S. PATENT DOCUMENTS

2020/0252990 A1 8/2020 Ganesan
2021/0250957 A1* 8/2021 Roth-Mandut ..... H04W 72/543
2021/0306824 A1* 9/2021 Li ......................... H04W 72/02

FOREIGN PATENT DOCUMENTS

CN 112806080 A 5/2021
CN 112956275 A 6/2021
(Continued)

OTHER PUBLICATIONS

International Search Report and Written Opinion mailed on Oct. 10, 2022, received for PCT Application PCT/CN2022/103836, filed on Jul. 5, 2022, 10 pages including English Translation.

*Primary Examiner* — Pamit Kaur
(74) *Attorney, Agent, or Firm* — XSENSUS LLP

(57) ABSTRACT

Provided in the present disclosure are a management electronic device and method for wireless communication, and a member electronic device and a method for wireless communication. The management electronic device for wireless communication comprises a processing circuit, wherein the processing circuit is configured to: select a bandwidth part (BWP) resource from a plurality of BWPs, so as to determine a multicast BWP used for multicast communication between the management electronic device and a plurality of member electronic devices in a group to which the management electronic device belongs, and/or a unicast BWP used for unicast communication between pre-
(Continued)

determined member electronic device pairs in the plurality of member electronic devices.

18 Claims, 15 Drawing Sheets

(56) References Cited

FOREIGN PATENT DOCUMENTS

| | | | |
|---|---|---|---|
| WO | 2020/089317 | A1 | 5/2020 |
| WO | WO-2021028387 | A1 | 2/2021 |

* cited by examiner

MANAGEMENT ELECTRONIC DEVICE AND METHOD FOR WIRELESS COMMUNICATION, AND MEMBER ELECTRONIC DEVICE AND METHOD FOR WIRELESS COMMUNICATION

CROSS-REFERENCE TO RELATED APPLICATIONS

This application is based on PCT filing PCT/CN2022/103836, filed Jul. 5, 2022, which claims the priority of Chinese Patent Application No. 202110795144.0, entitled "MANAGEMENT ELECTRONIC DEVICE AND METHOD FOR WIRELESS COMMUNICATION, AND MEMBER ELECTRONIC DEVICE AND METHOD FOR WIRELESS COMMUNICATION", filed with the Chinese Patent Office on Jul. 14, 2021, the entire contents of each are incorporated herein by reference.

FIELD OF THE INVENTION

Technical Field

The present disclosure relates to the technical field of wireless communications, particularly to the configuration and reselection of BWPs in a case of a plurality of bandwidth parts (BWPs, bandwidth parts), and more particularly, to a managing electronic apparatus, a member electronic apparatus, a sending electronic apparatus, a receiving electronic apparatus, and a method.

Background Art

In existing communication manners, there is an issue of energy saving and an issue of diversified service types, and how to configure BWPs has been a hotspot of researches.

SUMMARY OF THE INVENTION

A brief summary of the present invention is given below, to provide a basic understanding of some aspects of the present invention. It should be understood that the following summary is not an exhaustive summary of the present invention. It does not intend to determine a key or important part of the present invention, nor does it intend to limit the scope of the present invention. Its object is only to present some concepts in a simplified form, which serves as a preamble of a more detailed description to be discussed later.

According to one aspect of the present disclosure, there is provided a managing electronic apparatus for wireless communications, comprising processing circuitry configured to: select a bandwidth part, BWP, resource from a plurality of BWPs, for determining a BWP for multicast which is used for multicast communication (group communication) between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses.

According to one aspect of the present disclosure, there is provided a member electronic apparatus for wireless communications, comprising processing circuitry configured to: receive, from a managing electronic apparatus in a group to which the member electronic apparatus belongs, configuration information about a bandwidth part, BWP, for multicast and/or BWP for unicast determined from a plurality of BWPs, for multicast communication with the managing electronic apparatus based on the BWP for multicast, and/or unicast communication with other member electronic apparatuses in the group based on the BWP for unicast.

According to one aspect of the present disclosure, there is provided a sending electronic apparatus for wireless communications, comprising processing circuitry configured to: select a bandwidth part, BWP, resource from a plurality of BWPs, for unicast communication with a receiving electronic apparatus.

According to one aspect of the present disclosure, there is provided a receiving electronic apparatus electronic apparatus for wireless communications, comprising processing circuitry configured to: receive, from a sending electronic apparatus, configuration information about a selected bandwidth part, BWP, resource determined from a plurality of BWPs, for unicast communication with the sending electronic apparatus.

According to one aspect of the present disclosure, there is provided a method for wireless communications, the method executed by a managing electronic apparatus, the method comprising: selecting a bandwidth part, BWP, resource from a plurality of BWPs, for determining a BWP for multicast which is used for multicast communication between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses.

According to one aspect of the present invention, there is provided a method for wireless communications, the method executed by a member electronic apparatus, the method comprising: receiving, from a managing electronic apparatus in a group to which the member electronic apparatus belongs, configuration information about a bandwidth part, BWP, for multicast and/or BWP for unicast determined from a plurality of BWPs, for multicast communication with the managing electronic apparatus based on the BWP for multicast, and/or unicast communication with other member electronic apparatuses in the group based on the BWP for unicast.

According to one aspect of the present invention, there is provided a method for wireless communications, the method executed by a sending electronic apparatus, the method comprising: selecting a bandwidth part, BWP, resource from a plurality of BWPs, for unicast communication with a receiving electronic apparatus.

According to one aspect of the present invention, there is provided a method for wireless communications, the method executed by a receiving electronic apparatus, the method comprising: receiving, from a sending electronic apparatus, configuration information about a selected bandwidth part, BWP, resource determined from a plurality of BWPs, for unicast communication with the sending electronic apparatus.

According to other aspects of the present invention, there are further provided a computer program code and a computer program product for implementing the above-mentioned methods for wireless communications, as well as a computer readable storage medium on which the computer program code for implementing the above-mentioned methods for wireless communications is recorded.

These and other advantages of the present invention will be more apparent through the following detailed description of preferred embodiments of the present invention in conjunction with the accompanying drawings.

BRIEF DESCRIPTION OF THE DRAWINGS

In order to further set forth the above and other advantages and features of the present invention, specific embodiments of the present invention will be further described in detail below in conjunction with the accompanying drawings. The accompanying drawings together with the following detailed description are included in this specification and form a part of this specification. Elements with identical functions and structures are denoted by identical reference numerals. It should be understood that, these figures only describe typical examples of the present invention, and should not be regarded as limitations to the scope of the present invention. In the accompanying drawings.

DETAILED DESCRIPTION OF THE EMBODIMENTS

Hereinafter, exemplary embodiments of the present disclosure will be described in conjunction with the accompanying drawings. For the sake of clarity and conciseness, the description does not describe all features of actual embodiments. However, it should be understood that in developing any such actual embodiment, many decisions specific to the embodiments must be made, so as to achieve specific objects of a developer; for example, those limitation conditions related to systems and services are satisfied, and these limitation conditions possibly will vary as embodiments are different. In addition, it should also be appreciated that, although developing work may be very complicated and time-consuming, such developing work is only routine tasks for those skilled in the art benefiting from the present disclosure.

It should also be noted herein that, to avoid the present invention from being obscured due to unnecessary details, only those apparatus structures and/or processing steps closely related to the solution according to the present invention are shown in the accompanying drawings, while omitting other details not closely related to the present invention.

Figure 1:
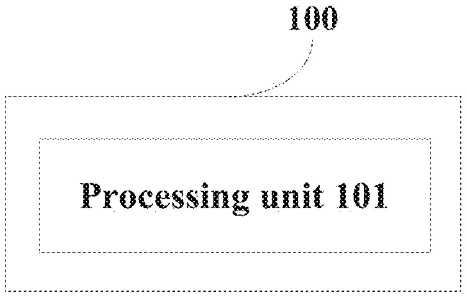
FIG. 1 shows a block diagram of functional modules of a managing electronic apparatus for wireless communications according to an embodiment of the present disclosure.

FIG. 1 shows a block diagram of functional modules of a managing electronic apparatus 100 for wireless communications according to an embodiment of the present disclosure. As shown in FIG. 1, the managing electronic apparatus 100 comprises: a processing unit 101 configured to select a BWP resource from a plurality of BWPs, for determining a BWP for multicast which is used for multicast communication between the managing electronic apparatus 100 and a plurality of member electronic apparatuses in a group to which the managing electronic apparatus 100 belongs and/or a BWP for unicast which is used for unicast communication between predetermined pairs of member electronic apparatuses in the plurality of member electronic apparatuses.

Wherein, the processing unit 101 may be implemented by one or more processing circuitries which may be implemented as, for example, a chip.

The managing electronic apparatus 100 may be arranged on user equipment (UE) side or communicably connected to user equipment, for example. It should also be noted herein that, the managing electronic apparatus 100 may be implemented at chip level or at device level. For example, the managing electronic apparatus 100 may work as user equipment itself, and may also include external devices such as a memory, a transceiver (not shown in the figure) and the like. The memory may be used to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be an eNB or gNB, for example.

The group includes the managing electronic apparatus 100 and the plurality of member electronic apparatuses.

As an example, the managing electronic apparatus 100 may select a required BWP for communication to be performed between all electronic apparatuses in the group to which the managing electronic apparatus 100 belongs (e.g., multicast communication to be performed between the managing electronic apparatus 100 and the member electronic apparatuses, and unicast communication between different member electronic apparatuses). As examples, the managing electronic apparatus 100 may select a BWP resource that is currently used by the managing electronic apparatus 100, as the selected BWP resource, for determining a BWP for multicast, the managing electronic apparatus 100 may select a BWP resource that is currently used by the predetermined pairs of member electronic apparatuses, as the selected BWP resource, for determining a BWP for unicast, and the managing electronic apparatus 100 may also randomly select a BWP resource from the plurality of BWPs. Those skilled in the art may also conceive of a manner of randomly selecting a BWP resource from the plurality of BWPs, which will not be repeatedly described herein.

The managing electronic apparatus 100 according to the embodiment of the present disclosure can select a BWP resource from a plurality of BWPs, for determining a BWP for multicast and/or a BWP for unicast, so that different BWPs can be used for multicast communication and/or or unicast communication in a group, thereby making it possible to achieve at least one of: enhancing reliability of communication, reducing latency of communication, facilitating energy saving, and being capable of satisfying different types of service requirements.

As an example, the processing unit 101 may be configured to select a BWP resource in a scenario of sidelink communication.

In the following, selecting the BWP resource by the managing electronic apparatus 100 will be described mainly in conjunction with a scenario of 5G NR sidelink communication. However, those skilled in the art may understand that, the following description about selecting the BWP resource is not limited to the scenario of sidelink communication, but may be applied to other scenarios of selecting the BWP resource in 4G or 5G or other communication manners.

As an example, the plurality of BWPs are a first predetermined number of BWP sets, wherein each BWP set respectively includes the same initial BWP and a second predetermined number of BWPs differing from each other.

As an example, the first predetermined number of BWP sets are dispersed in frequency domain, such that co-channel interference (co-frequency interference) may be avoided. As an example, the second predetermined number of BWPs differing from each other have different parameter sets, which may include size, subcarrier spacing, cyclic prefix type, and the like. Thus, the plurality of BWPs can be used to handle different service scenarios such as various road types and speeds.

As an example, for the multicast communication, the managing electronic apparatus 100 can only select one BWP set at the same time, and can only activate one BWP in the one BWP set as the BWP for multicast. The role of the initial BWP is that it is still possible to coordinate resources between electronic apparatuses on the initial BWP when the BWP has been activated, and a bandwidth of the initial BWP is small and is conducive to energy saving.

Figure 2:
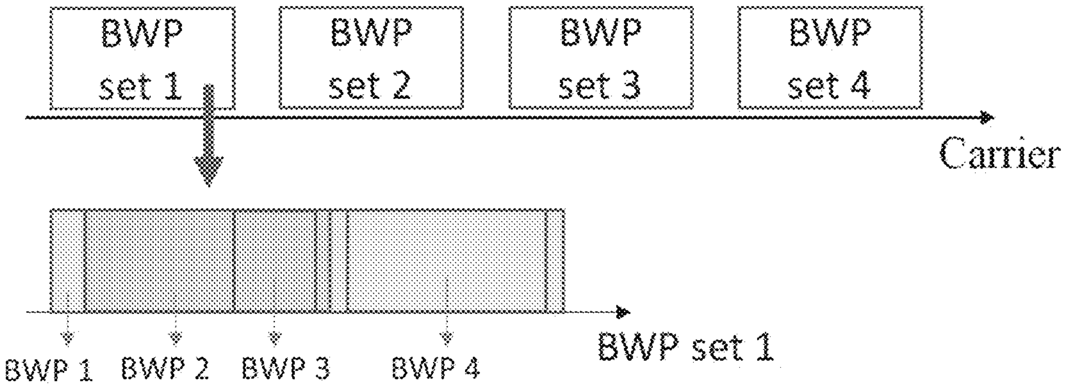
FIG. 2 is a diagram showing an example of BWP sets according to an embodiment of the present disclosure.

FIG. 2 is a diagram showing an example of BWP sets according to an embodiment of the present disclosure. In FIG. 2, it is assumed that both the first predetermined number and the second predetermined number are 4, and FIG. 2 shows 4 BWP sets, i.e., a BWP set 1 to a BWP set 4, as well as BWP1 to BWP4 included in the BWP set 1. Different BWP blocks may be either continuous or discontinuous. For example, as shown in FIG. 2, there is spacing between BWP3 and BWP4, indicating that BWP3 and BWP4 are discontinuous. For simplicity, the initial BWP is not shown in FIG. 2.

As an example, the processing unit 101 may be configured to inform, when the group is established, the plurality of member electronic apparatuses of configuration information of the first predetermined number of BWP sets through Radio Resource Control (RRC) connection request signaling, on the initial BWP.

Since there may be member electronic apparatuses with weaker capabilities among the plurality of member electronic apparatuses, the managing electronic apparatus 100 with stronger capabilities may inform the member electronic apparatuses of configuration information (including configuration information of BWPs in each BWP set) of the first predetermined number of BWP sets. Thus, all the plurality of member electronic apparatuses can know the configuration information of the first predetermined number of BWP sets, so as to facilitate BWP reselection and switching that may occur in the future.

In addition, the managing electronic apparatus 100 and the plurality of member electronic apparatuses also exchange RRC parameters on the initial BWP.

As an example, the configuration information of the first predetermined number of BWP sets includes indicator information about the BWP sets and BWPs in each BWP set. For example, for the BWP sets as shown in FIG. 2, only 4 bits of indicator information are required in order to indicate specific BWPs in the BWP sets. For example, the former 2 bits are used to distinguish the 4 BWP sets, while the latter 2 bits are used to distinguish the 4 BWPs in each BWP set. In this way, for example, when it is required to switch the BWP resource since the service type is changed after the group is established, only a small amount of indicator information is required in order to inform the member electronic apparatuses of the switched BWP resource, thereby making it possible to reduce communication load and further reduce latency.

In a first example of the present disclosure, the managing electronic apparatus 100 is within coverage of a network side equipment that provides services thereto. The member electronic apparatuses may be within the coverage of the network side equipment, and may also not be within the coverage of the network side equipment.

For example, the network side equipment may be a base station. Those skilled in the art may also conceive of other examples of the network side equipment, which will not be repeatedly described here.

Figure 3:
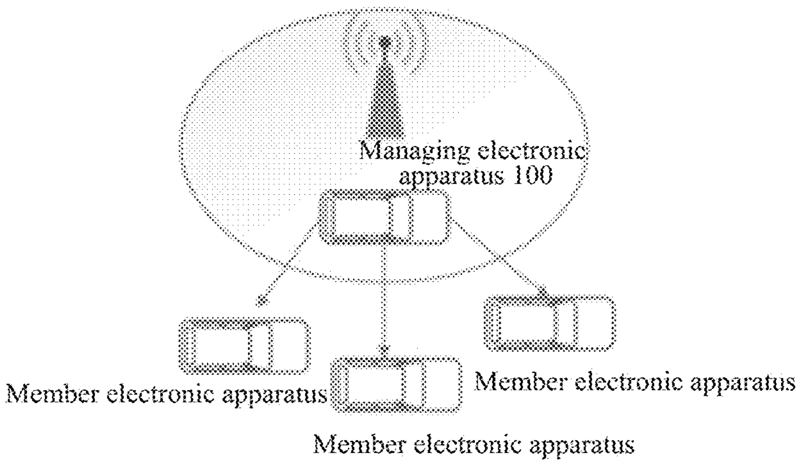
FIG. 3 is a diagram showing a distribution example of a managing electronic apparatus and member electronic apparatuses according to a first example of the present disclosure.

FIG. 3 is a diagram showing a distribution example of the managing electronic apparatus 100 and member electronic apparatuses according to the first example of the present disclosure. For simplicity, FIG. 3 only exemplarily shows that 3 member electronic apparatuses are included. As an example, FIG. 3 shows that the managing electronic apparatus 100 is within coverage of the base station, and none of the 3 member electronic apparatuses is within the coverage of the base station.

As an example, the processing unit 101 may be configured to receive indication information from the network side equipment through control signaling, the indication information indicating whether the managing electronic apparatus 100 can independently determine the BWP for multicast In a case where the managing electronic apparatus 100 cannot independently determine the BWP for multicast, it is required that the managing electronic apparatus 100 reports a selected BWP resource used for the multicast communication to the base station, and the selected BWP resource can be used only after consent by the base station. Since the base station can coordinate the BWP resources for the multicast communication, reliability of the multicast communication can be further enhanced, and different types of service requirements can be further satisfied.

In a case where the managing electronic apparatus 100 can independently determine the BWP for multicast, it is not required that the managing electronic apparatus 100 reports a selected BWP resource used for the multicast communication to the base station, but a BWP resource used for the multicast communication that is selected by the managing electronic apparatus 100 is directly determined as the BWP for multicast. In this way, interaction between the managing electronic apparatus 100 and the base station about the BWP resource used for the multicast communication can be omitted, thereby saving communication resources.

As an example, the control signaling includes Downlink Control Information (DCI). For example, the Downlink Control Information may be DCI 3_0 in TS38.212. For example, 1 bit in the DCI may be used as the indication information. For example, when the indication information is 1, it is indicated that the managing electronic apparatus 100 can independently determine the BWP for multicast, while when the indication information is 0, it is indicated that the managing electronic apparatus 100 cannot independently determine the BWP for multicast.

Those skilled in the art may also conceive of other examples of the above control signaling, which will not be repeatedly described here.

As an example, the processing unit 101 may be configured to report, in a case where the indication information indicates that the managing electronic apparatus 100 cannot independently determine the BWP for multicast, configuration information of a BWP resource used for the multicast communication that is selected by the managing electronic apparatus 100, and configuration information of at least one candidate BWP resource that can be used for the multicast communication in the plurality of BWPs, to the network side equipment.

For example, the BWP resource used for the multicast communication that is selected by the managing electronic apparatus 100 may be a BWP resource that is currently used by the managing electronic apparatus 100.

As an example, the processing unit 101 may be configured to perform the reporting through a Physical Uplink Shared Channel (PUSCH).

In addition to the PUSCH, those skilled in the art may also conceive of other examples of performing the reporting, which will not be repeatedly described here.

As an example, the processing unit 101 may be configured to receive a BWP resource fed back from the network side equipment, and to determine the fed back BWP resource as the BWP for multicast, wherein the fed back BWP resource is a BWP resource used for the multicast communication that is selected by the managing electronic apparatus 100, or a BWP resource that is selected by the network side equipment from the at least one candidate BWP resource.

For example, after receiving the reporting from the managing electronic apparatus 100, the base station feeds back to the managing electronic apparatus 100 whether to consent the BWP selection this time. If it consents, the BWP resource used for the multicast communication that is selected by the managing electronic apparatus 100 is determined as the BWP for multicast, and if it does not consent (for example, the base station finds severe congestion and/or strong interference in the selected BWP frequency band), the base station selects a BWP resource that it considers usable from the candidate BWP resources, and may feed the same back to the managing electronic apparatus 100 through the indicator information. After receiving the feedback, the managing electronic apparatus 100 will switch to the BWP resource fed back from the base station.

As an example, the processing unit 101 may be configured to receive the BWP resource fed back by the network side equipment, through a Physical Downlink Shared Channel (PDSCH). In addition to the PDSCH, those skilled in the art may also conceive of other examples of receiving the BWP resource that is determined by feedback, which will not be repeatedly described here.

As an example, the processing unit 101 may be configured to determine, in a case where the indication information indicates that the managing electronic apparatus 100 can independently determine the BWP for multicast, a BWP resource used for the multicast communication that is selected by the managing electronic apparatus 100, as the BWP for multicast. As described above, in a case where the managing electronic apparatus 100 can independently determine the BWP for multicast, the managing electronic apparatus 100 is not required to report a selected BWP resource used for the multicast communication to the base station, but directly determines a BWP resource used for the multicast communication that is selected by the managing electronic apparatus 100, as the BWP for multicast.

As an example, the processing unit 101 may be configured to inform the plurality of member electronic apparatuses of configuration information of the BWP for multicast through RRC reconfiguration signaling. That is to say, the managing electronic apparatus 100 may activate the BWP for multicast through RRC reconfiguration signaling. The member electronic apparatus compares the configuration information of the BWP for multicast with configuration information of a current BWP resource of the member electronic apparatus. If the configuration information of the BWP for multicast is not the same as the configuration information of the current BWP resource of the member electronic apparatus, the member electronic apparatus switches the current BWP resource to the BWP for multicast, and if the configuration information of the BWP for multicast is the same as the configuration information of the current BWP resource of the member electronic apparatus, the member electronic apparatus maintains the current BWP resource.

As an example, the processing unit 101 may be configured to receive a perception result from at least one member electronic apparatus among the plurality of member electronic apparatuses for time-frequency resource blocks on the BWP for multicast, and to select, based on the perception result, a time-frequency resource pool used for the multicast communication. As an example, the managing electronic apparatus 100 may receive the perception result (e.g., unoccupied time-frequency resources perceived by the above-mentioned at least one member electronic apparatus on the BWP for multicast) from the above-mentioned at least one member electronic apparatus on the BWP for multicast through a Physical Sidelink Control Channel (PSSCH). For example, the managing electronic apparatus 100 may comprehensively consider all reported perception results and accordingly select a time-frequency resource pool usable by all members in the group and, for example, issue the selected time-frequency resource pool to all the member electronic apparatuses in the group through the PSSCH.

As an example, the processing unit 101 may be configured to receive a message that switching is successful on the BWP for multicast that is fed back via Sidelink Control Information (SCI) of the plurality of member electronic apparatuses, and to perform the multicast communication based on the message. The SCI may include first phase SCI as control information transmitted on a control channel or second phase SCI as control information transmitted on a data channel. For example, the managing electronic apparatus 100 may receive feedback that switching is successful on the BWP for multicast, via the second phase SCI of the plurality of member electronic apparatuses. When the managing electronic apparatus 100 receives feedback that all the member electronic apparatuses in the group are successful in switching, it is regarded that BWP switching is successful, so that multicast service transmission may be started.

Figure 4:
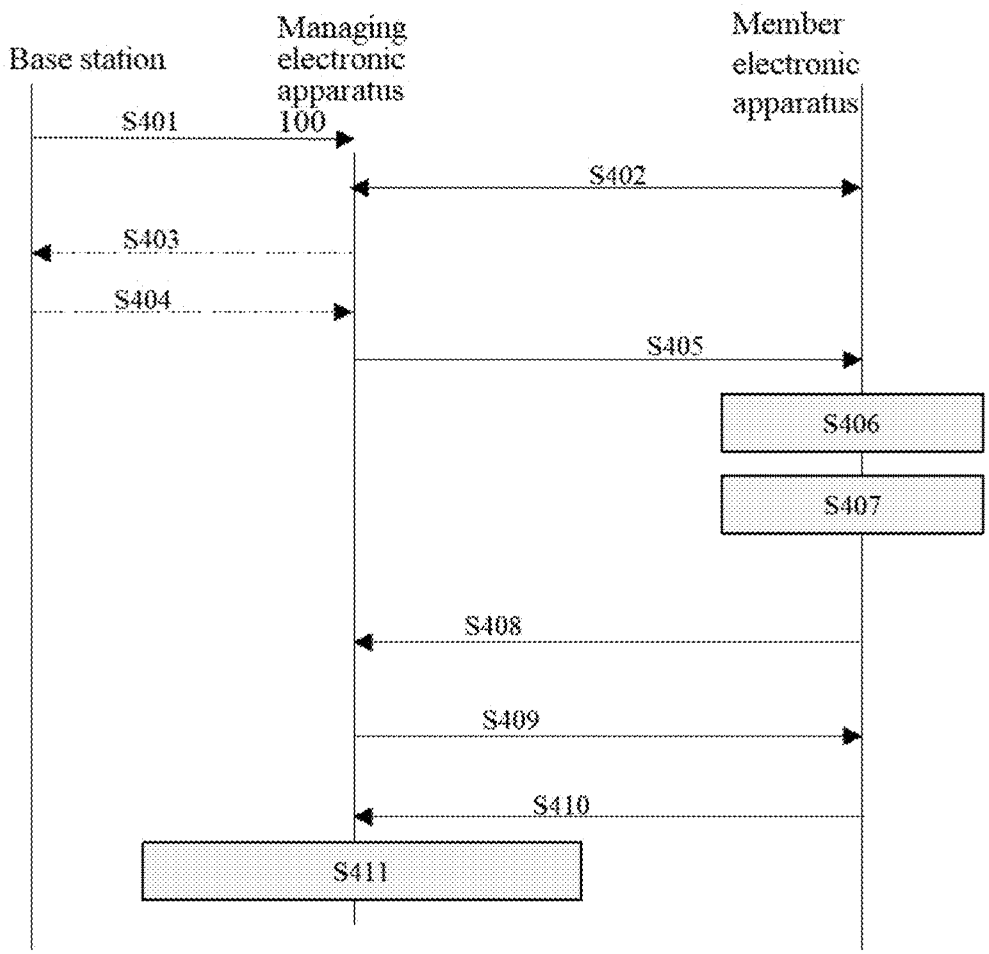
FIG. 4 is a diagram showing an example of information interaction for switching of the BWP for multicast between the managing electronic apparatus and the member electronic apparatuses according to the first example of the present disclosure.

FIG. 4 is a diagram showing an example of information interaction for switching of the BWP for multicast between the managing electronic apparatus 100 and the member electronic apparatuses according to the first example of the present disclosure. For example, FIG. 4 shows an example of information interaction for switching of the BWP for multicast between the managing electronic apparatus 100 and the member electronic apparatuses in FIG. 3. Although FIG. 4 shows only one member electronic apparatus, for those skilled in the art, information interaction for switching of the BWP for multicast between the managing electronic apparatus 100 and the other member electronic apparatuses in the group is similar to that in FIG. 4.

In S401, the managing electronic apparatus 100 receives indication information indicating whether the managing electronic apparatus 100 can independently determine the BWP for multicast, from the base station, through control signaling. In S402, the managing electronic apparatus 100 informs the member electronic apparatus of configuration information of the first predetermined number of BWP sets through RRC connection request signaling, on the initial BWP, and the managing electronic apparatus 100 and the member electronic apparatus may also exchange RRC parameters on the initial BWP. In S403, in a case where the managing electronic apparatus 100 cannot independently determine the BWP for multicast, the managing electronic apparatus 100 reports configuration information of a BWP resource used for the multicast communication that is selected by the managing electronic apparatus 100, and configuration information of at least one candidate BWP resource that can be used for the multicast communication in the plurality of BWPs, to the base station. In S404, in a case where the managing electronic apparatus 100 cannot independently determine the BWP for multicast, the managing electronic apparatus 100 receives a BWP resource fed back from the network side equipment, and determines the fed back BWP resource as the BWP for multicast. It should be noted that, in a case where the managing electronic apparatus 100 can independently determine the BWP for multicast, it is not required to perform S403 and S404, and a BWP resource used for the multicast communication that is selected by the managing electronic apparatus 100 is directly determined as the BWP for multicast. In S405, the managing electronic apparatus 100 informs the member electronic apparatus of configuration information of the BWP for multicast through RRC reconfiguration signaling. In S406, the member electronic apparatus compares the configuration information of the BWP for multicast with configuration information of a current BWP resource of the member electronic apparatus. In S407, if the configuration information of the BWP for multicast is not the same as the configuration information of the current BWP resource of the member electronic apparatus, the member electronic apparatus switches the current BWP resource to the BWP for multicast, and if the configuration information of the BWP for multicast is the same as the configuration information of the current BWP resource of the member electronic apparatus, the member electronic apparatus maintains the current BWP resource. In S408, the managing electronic apparatus 100 receives a perception result from the member electronic apparatus for time-frequency resource blocks on the BWP for multicast. In S409, the managing electronic apparatus 100 selects, based on the perception result, a time-frequency resource pool used for the multicast communication, and informs the member electronic apparatus of configuration information of the time-frequency resource pool. In S410, the managing electronic apparatus 100 receives feedback that switching of the BWP for multicast is successful, from the member electronic apparatus. In S411, the managing electronic apparatus 100 performs the multicast communication after receiving message that switching of the BWP for multicast is successful that is fed back by all the member electronic apparatuses.

In a second example of the present disclosure, at least one member electronic apparatus among the plurality of member electronic apparatuses is within coverage of a network side equipment that provides services thereto, and the managing electronic apparatus 100 is not within the coverage of the network side equipment.

The network side equipment may be a base station, for example.

Figure 5:
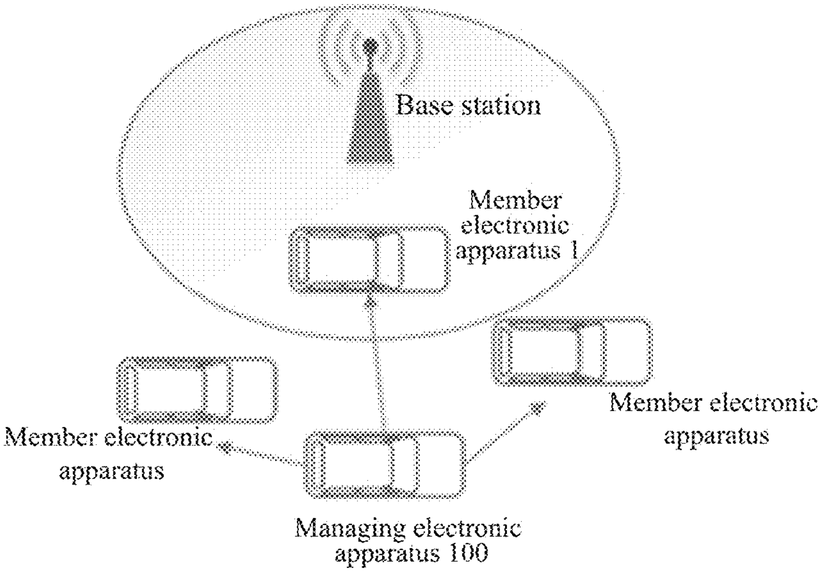
FIG. 5 is a diagram showing a distribution example of the managing electronic apparatus and the member electronic apparatuses according to a second example of the present disclosure.

FIG. 5 is a diagram showing a distribution example of the managing electronic apparatus 100 and the member electronic apparatuses according to the second example of the present disclosure. As an example, FIG. 5 shows 3 member electronic apparatuses (i.e., member electronic apparatus 1 and other two member electronic apparatuses), and it is assumed that the member electronic apparatus 1 is within coverage of the base station and that the managing electronic apparatus 100 is not within the coverage of the base station.

In the second example, the processing unit 101 may be configured to determine, as the BWP for multicast, a BWP resource used for the multicast communication that is selected by the managing electronic apparatus 100, and to inform the plurality of member electronic apparatuses of configuration information of the BWP for multicast through RRC reconfiguration signaling. The member electronic apparatus compares the configuration information of the BWP for multicast with configuration information of a current BWP resource of the member electronic apparatus. If the configuration information of the BWP for multicast is not the same as the configuration information of the current BWP resource of the member electronic apparatus, the member electronic apparatus switches the current BWP resource to the BWP for multicast, and if the configuration information of the BWP for multicast is the same as the configuration information of the current BWP resource of the member electronic apparatus, the member electronic apparatus maintains the current BWP resource.

Since the managing electronic apparatus 100 is not within the coverage of the network side equipment, the managing electronic apparatus 100 is not required to report a BWP resource used for the multicast communication that is selected by the managing electronic apparatus 100 to the network side equipment, but directly determines a BWP resource used for the multicast communication that is selected by the managing electronic apparatus 100, as the BWP for multicast.

In the second example, the processing unit 101 may be configured to receive a perception result from at least one member electronic apparatus among the plurality of member electronic apparatuses for time-frequency resource blocks on the BWP for multicast, and to select, based on the perception result, a time-frequency resource pool used for the multicast communication. As an example, the managing electronic apparatus 100 may receive the perception result (e.g., unoccupied time-frequency resources perceived by the above-mentioned at least one member electronic apparatus on the BWP for multicast) from the above-mentioned at least one member electronic apparatus on the BWP for multicast through PSSCH. For example, the managing electronic apparatus 100 may comprehensively consider all reported perception results and accordingly select a time-frequency resource pool usable by all members in the group and, for example, issue the selected time-frequency resource pool to all the member electronic apparatuses in the group through the PSSCH.

In the second example, the processing unit 101 may be configured to receive a message that switching is successful on the BWP for multicast that is fed back via Sidelink Control Information, SCI, of the plurality of member electronic apparatuses, and to perform the multicast communication before or after the at least one member electronic apparatus reports configuration information of the BWP for multicast to the network side equipment and receives feedback about successfully receiving the configuration information from the network side equipment. The SCI may include first phase SCI as control information transmitted on a control channel or second phase SCI as control information transmitted on a data channel. For example, the managing electronic apparatus 100 may receive feedback that switching is successful on the BWP for multicast, via the second phase SCI of the plurality of member electronic apparatuses. As described above, in the second example, at least one member electronic apparatus (e.g., the member electronic apparatus as shown in FIG. 5) among the plurality of member electronic apparatuses is within coverage of the base station, and thus, the at least one member electronic apparatus (e.g., the member electronic apparatus as shown in FIG. 5) may report configuration information of the BWP for multicast to the base station through PUSCH (for example, it is only required to report indicator information of the BWP for multicast), the base station accordingly can know an occupation situation of resources, and further, the base station feeds back successfully receiving the configuration information of the BWP for multicast, to the at least one member electronic apparatus (e.g., the member electronic apparatus as shown in FIG. 5). Thereafter, the managing electronic apparatus 100 may start to perform multicast service transmission.

Figure 6:
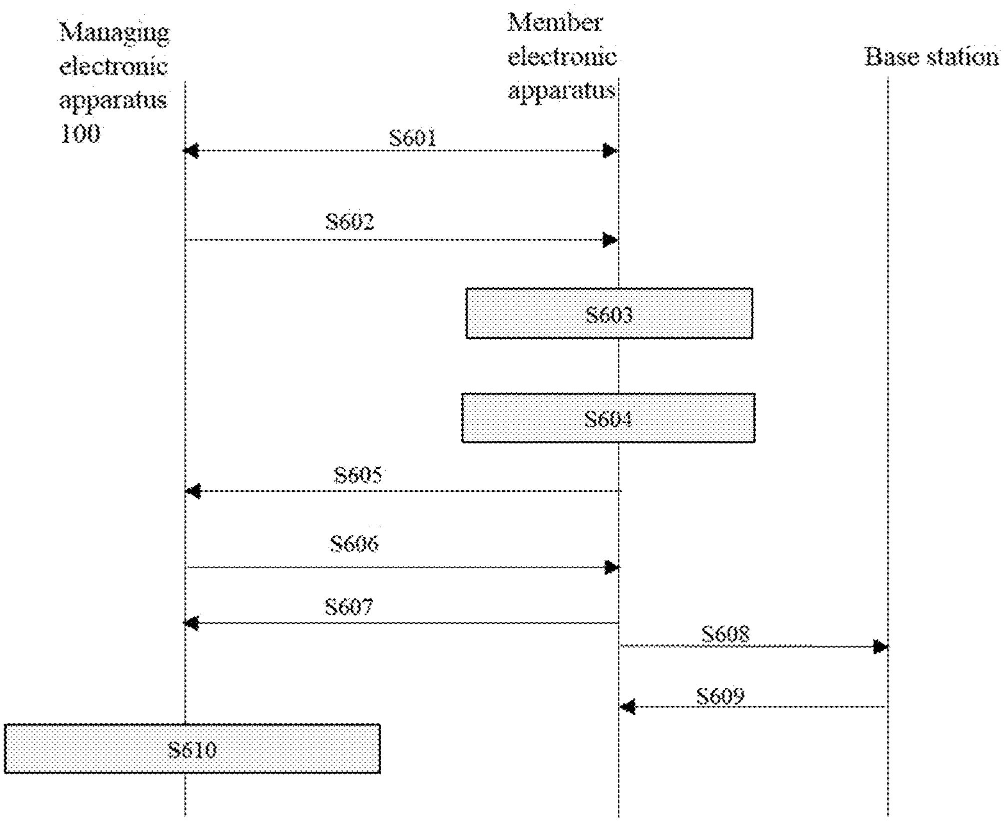
FIG. 6 is a diagram showing an example of information interaction for switching of the BWP for multicast between the managing electronic apparatus and the member electronic apparatuses according to the second example of the present disclosure.

FIG. 6 is a diagram showing an example of information interaction for switching of the BWP for multicast between the managing electronic apparatus 100 and the member electronic apparatuses according to the second example of the present disclosure. For example, FIG. 6 shows an example of information interaction for switching of the BWP for multicast between the managing electronic apparatus 100 and the member electronic apparatus 1 (abbreviated as "member electronic apparatus" in FIG. 6) in FIG. 5.

In S601, the managing electronic apparatus 100 informs the member electronic apparatus of configuration information of the first predetermined number of BWP sets through RRC connection request signaling, on the initial BWP, and the managing electronic apparatus 100 and the member electronic apparatus also exchange RRC parameters on the initial BWP. In S602, the managing electronic apparatus 100 informs the member electronic apparatus of configuration information of the BWP for multicast through RRC reconfiguration signaling. In S603, the member electronic apparatus compares the configuration information of the BWP for multicast with configuration information of a current BWP resource of the member electronic apparatus. In S604, if the configuration information of the BWP for multicast is not the same as the configuration information of the current BWP resource of the member electronic apparatus, the member electronic apparatus switches the current BWP resource to the BWP for multicast, and if the configuration information of the BWP for multicast is the same as the configuration information of the current BWP resource of the member electronic apparatus, the member electronic apparatus maintains the current BWP resource. In S605, the managing electronic apparatus 100 receives a perception result from the member electronic apparatus for time-frequency resource blocks on the BWP for multicast. In S606, the managing electronic apparatus 100 selects, based on the perception result, a time-frequency resource pool used for the multicast communication, and informs the member electronic apparatus of configuration information of the time-frequency resource pool. In S607, the managing electronic apparatus 100 receives feedback that BWP switching is successful, from the member electronic apparatus. In S608, the member electronic apparatus reports configuration information of the BWP for multicast to the base station. In S609, the member electronic apparatus receives feedback about successfully receiving configuration information, from the base station. In S610, the managing electronic apparatus 100 performs multicast communication after receiving a message that switching of the BWP for multicast is successful that is fed back by all the member electronic apparatuses. Although FIG. 6 shows that S610 is after S608 and S609, S610 may be before S608 and S609.

As an example, the processing unit 101 may be configured to activate a predetermined timer in a case of not performing the multicast communication on the initial BWP, and to switch the BWP for multicast to the initial BWP if, within timing by the predetermined timer, the managing electronic apparatus 100 sends no data and the plurality of member electronic apparatuses receive no data. This BWP switching manner may be referred to as timer-based BWP switching, which is helpful for energy saving.

Figure 7:
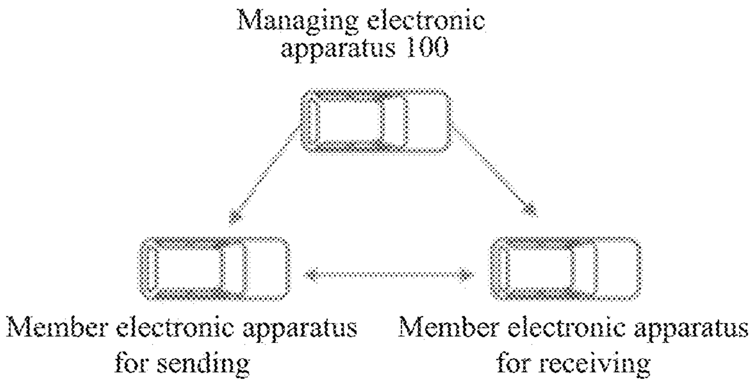
FIG. 7 is a diagram showing a distribution example of the managing electronic apparatus and the member electronic apparatuses according to a third example of the present disclosure.

FIG. 7 is a diagram showing a distribution example of the managing electronic apparatus 100 and the member electronic apparatuses according to a third example of the present disclosure. As an example, FIG. 7 shows the managing electronic apparatus 100 and 2 member electronic apparatuses to perform unicast communication: a member electronic apparatus used for sending data (marked as a member electronic apparatus for sending in FIG. 7) and a member electronic apparatus used for receiving data (marked as a member electronic apparatus for receiving in FIG. 7). In a case where unicast communication is to be performed between member electronic apparatuses in the group, resources may be allocated for unicast communication by the managing electronic apparatus 100.

As an example, the processing unit 101 may be configured to inform the predetermined pairs of member electronic apparatuses of configuration information of the BWP for unicast through RRC reconfiguration signaling.

The member electronic apparatus used for sending data in the predetermined pairs of member electronic apparatuses requests the managing electronic apparatus 100 to communicate with the member electronic apparatus used for receiving data, and then the managing electronic apparatus 100 will allocate BWP resources having no conflict with a current multicast service for it, as the BWP for unicast.

The member electronic apparatus used for sending data may receive a perception result for time-frequency resource blocks on the BWP for unicast (for example, unoccupied time-frequency resource on the BWP for unicast), from the member electronic apparatus used for receiving data, for example via PSSCH, and select, based on the perception result, a time-frequency resource pool used for unicast communication, and inform the member electronic apparatus used for receiving data of configuration information of the time-frequency resource pool, for example via the PSSCH. As can be seen from the above, in this embodiment, the BWP for unicast is determined by the managing electronic apparatus 100, and the time-frequency resource pool used for unicast communication is selected by the member electronic apparatus used for sending data.

As an example, the processing unit 101 may be configured to receive a message that switching is successful on the BWP resource for unicast that is fed back via SCI of the predetermined pairs of member electronic apparatuses. The SCI is, for example, second stage SCI. The member electronic apparatus used for sending data may then communicate with the member electronic apparatus used for receiving data.

As an example, the processing unit 101 may be configured to activate a predetermined timer in a case where the unicast communication is not performed on the initial BWP, and to switch the unicast BWP to the initial BWP if, within timing by the predetermined timer, the predetermined pairs of member electronic apparatuses do not receive/send data. This timer-based BWP switching is helpful for energy saving.

Figure 8:
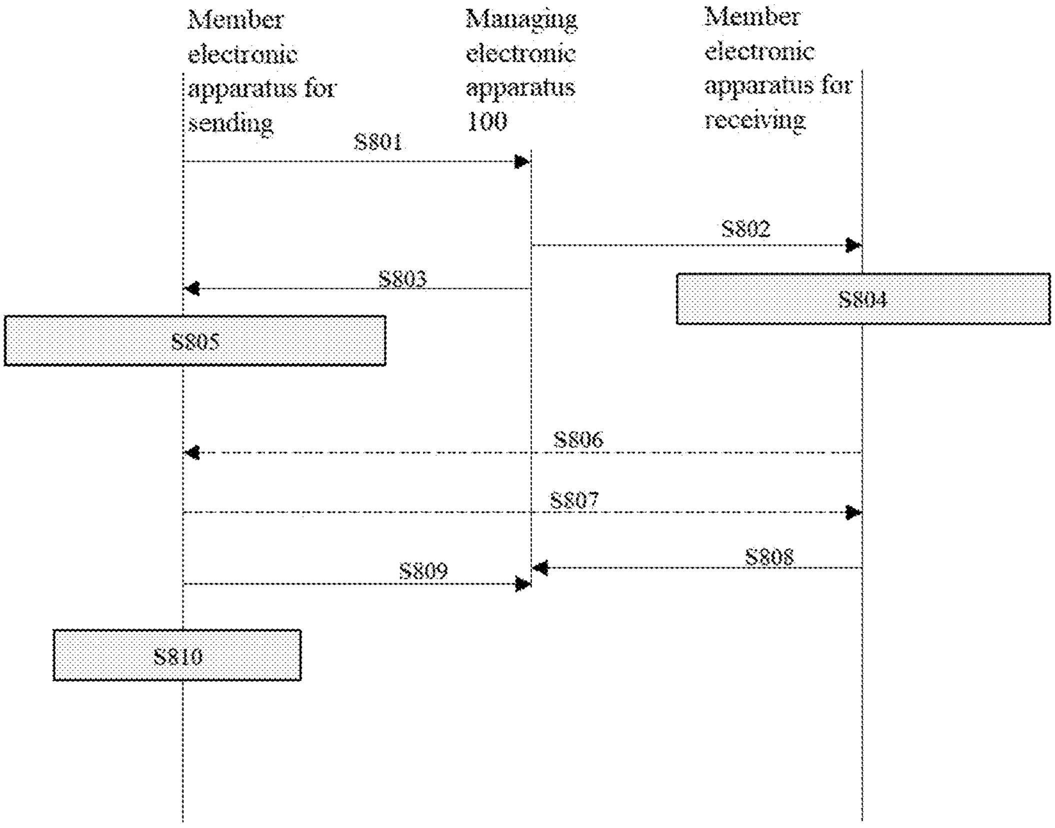
FIG. 8 is a diagram showing an example of information interaction for switching of the BWP for unicast between the managing electronic apparatus and the member electronic apparatuses according to the third example of the present disclosure.

FIG. 8 is a diagram showing an example of information interaction for switching of the BWP for unicast between the managing electronic apparatus 100 and the member electronic apparatuses according to the third example of the present disclosure. For example, FIG. 8 shows an example of information interaction for switching of the BWP for unicast between the managing electronic apparatus 100 and the member electronic apparatus for sending together with the member electronic apparatus for receiving in FIG. 7.

In S801, the managing electronic apparatus 100 receives a request for unicast communication with the member electronic apparatus for receiving, from the member electronic apparatus for sending. In S802, the managing electronic apparatus 100 informs the member electronic apparatus for receiving of configuration information of the BWP for unicast through RRC reconfiguration signaling. In S803, the managing electronic apparatus 100 informs the member electronic apparatus for sending of configuration information of the BWP for unicast through RRC reconfiguration signaling. Although it is shown in the figure that S802 is before S803, S802 may be after S803. In S804, the member electronic apparatus for receiving switches to the BWP for unicast. In S805, the member electronic apparatus for sending switches to the BWP for unicast. Although it is shown in the figure that S804 is before S805, S804 may be after S805. In S806, the member electronic apparatus for sending receives a perception result from the member electronic apparatus for receiving for time-frequency resource blocks on the BWP for unicast, from the member electronic apparatus for receiving. In S807, the member electronic apparatus for sending selects, based on the perception result, a time-frequency resource pool used for unicast communication, and informs the member electronic apparatus for receiving of configuration information of the time-frequency resource pool. In S808, the managing electronic apparatus 100 receives feedback that switching of the BWP for unicast is successful, from the member electronic apparatus for receiving. In S809, the managing electronic apparatus 100 receives feedback that switching of the BWP for unicast is successful, from the member electronic apparatus for sending. Although it is shown in the figure that S808 is before S809, S808 may be after S809. In S810, the member electronic apparatus for sending performs unicast communication with the member electronic apparatus for receiving.

In correspondence to the above-mentioned managing electronic apparatus 100, the present disclosure further provides a member electronic apparatus 9000 for wireless communications.

Figure 9:
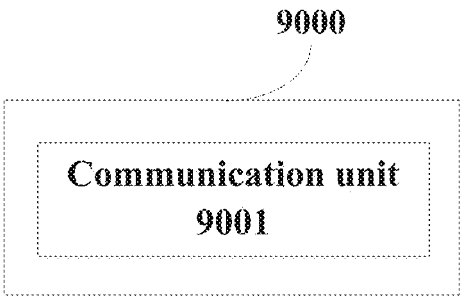
FIG. 9 shows a block diagram of functional modules of a member electronic apparatus for wireless communications according to an embodiment of the present disclosure.

FIG. 9 shows a block diagram of functional modules of the member electronic apparatus 9000 for wireless communications according to an embodiment of the present disclosure. As shown in FIG. 9, the member electronic apparatus 9000 comprises a communication unit 9001 that may be configured to receive, from a managing electronic apparatus in a group to which the member electronic apparatus belongs, configuration information about a BWP for multicast and/or BWP for unicast determined from a plurality of BWPs, for multicast communication with the managing electronic apparatus based on the BWP for multicast, and/or unicast communication with other member electronic apparatuses in the group based on the BWP for unicast.

Wherein, the communication unit 9001 may be implemented by one or more processing circuitries which may be implemented as, for example, a chip.

The member electronic apparatus 9000 may be arranged on user equipment (UE) side or communicably connected to user equipment, for example. It should also be noted herein that, the member electronic apparatus 9000 may be implemented at chip level or at device level. For example, the member electronic apparatus 9000 may work as user equipment itself, and may also include external devices such as a memory, a transceiver (not shown in the figure) and the like.

The memory may be used to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be an eNB or gNB, for example.

A managing electronic apparatus corresponding to the member electronic apparatus 9000 may be the managing electronic apparatus 100 as described above, for example.

The member electronic apparatus 9000 according to the embodiment of the present disclosure can receive, from a managing electronic apparatus, configuration information about a BWP for multicast and/or BWP for unicast determined from a plurality of BWPs, for multicast communication and/or unicast communication in a group by using different BWPs, thereby making it possible to achieve at least one of: enhancing reliability of communication, reducing latency of communication, facilitating energy saving, and being capable of satisfying different types of service requirements As an example, the communication unit 9001 may be configured to receive configuration information of the BWP for multicast and/or the BWP for unicast in a scenario of sidelink communication.

In the following, receiving configuration information of the BWP for multicast and/or the BWP for unicast by the member electronic apparatus 9000 will be described mainly in conjunction with a scenario of 5G NR sidelink communication. However, those skilled in the art may understand that, the following description about receiving configuration information of the BWP for multicast and/or the BWP for unicast is not limited to the scenario of sidelink communication, but may be applied to other scenarios of receiving configuration information of the BWP for multicast and/or the BWP for unicast in 4G or 5G or other communication manners.

As an example, the plurality of BWPs are a first predetermined number of BWP sets, wherein each BWP set respectively includes the same initial BWP and a second predetermined number of BWPs differing from each other.

For description of the first predetermined number of BWP sets, please refer to the corresponding part of FIG. 2 for the managing electronic apparatus 100, which will not be repeatedly described here.

As an example, the communication unit 9001 may be configured to receive configuration information of the first predetermined number of BWP sets, on the initial BWP, via RRC connection request signaling sent from the managing electronic apparatus.

As an example, the configuration information of the first predetermined number of BWP sets includes indicator information about the BWP sets and BWPs in each BWP set. For description of the indicator information, please refer to the corresponding part for the managing electronic apparatus 100, which will not be repeatedly described here.

As an example, the communication unit 9001 may be configured to receive configuration information of the BWP for multicast via RRC reconfiguration signaling sent from the managing electronic apparatus.

As an example, the communication unit 9001 may be configured to compare the configuration information of the BWP for multicast with configuration information of a current BWP resource of the member electronic apparatus 9000, to switch the current BWP resource to the BWP for multicast if they are not the same, and to maintain the current BWP resource if they are the same.

As an example, the communication unit 9001 may be configured to report a perception result for time-frequency resource blocks on the BWP for multicast to the managing electronic apparatus, for the managing electronic apparatus to select, based on the perception result, a time-frequency resource block used for the multicast communication As an example, the communication unit 9001 may be configured to feed back a message that switching is successful on the BWP for multicast, to the managing electronic apparatus, via SCI. For example, the SCI is second phase SCI.

As an example, the member electronic apparatus 9000 is within coverage of a network side equipment that provides services thereto, and the managing electronic apparatus is not within the coverage of the network side equipment. For example, the network side equipment is a base station. For example, the member electronic apparatus 9000 within coverage of the base station may be the member electronic apparatus 1 as shown in FIG. 5.

As an example, the communication unit 9001 may be configured to report configuration information of the BWP for multicast to the network side equipment, and to receive feedback about successfully receiving of configuration information from the network side equipment. Thus, the network side equipment can know a utilization situation of resources.

In a case where the member electronic apparatus 9000 is to perform unicast communication with other member electronic apparatuses in the group, resources may be allocated for the unicast communication by the managing electronic apparatus.

As an example, the communication unit 9001 may be configured to send a request for the unicast communication to the managing electronic apparatus, and to receive configuration information of the BWP for unicast through RRC reconfiguration signaling. For example, the member electronic apparatus 9000 that sends a request for the unicast communication to the managing electronic apparatus may be the member electronic apparatus for sending in FIG. 7.

As an example, the member electronic apparatus 9000 may be an electronic apparatus used for sending data in the unicast communication, and the communication unit 9001 may be configured to: receive a perception result for time-frequency resource blocks on the BWP for unicast from other member electronic apparatuses which are to perform unicast communication with the member electronic apparatus 9000, and select, based on the perception result, a time-frequency resource pool used for the unicast communication.

As an example, the member electronic apparatus 9000 may be an electronic apparatus used for receiving data in the unicast communication, and the communication unit 9001 may be configured to report a perception result for time-frequency resource blocks on the BWP for unicast to the other member electronic apparatuses, for the other member electronic apparatuses to select, based on the perception result, a time-frequency resource block used for the unicast communication. For example, the member electronic apparatus 9000 for receiving data may be the member electronic apparatus for receiving in FIG. 7.

A manner in which an electronic apparatus performs BWP switching by receiving RRC reconfiguration signaling may be referred to as an active BWP switching manner. The active BWP switching manner is relatively flexible. As mentioned above, for example, the member electronic apparatus may receive configuration information of the BWP for multicast and/or the BWP for unicast through RRC reconfiguration signaling.

Figure 10:
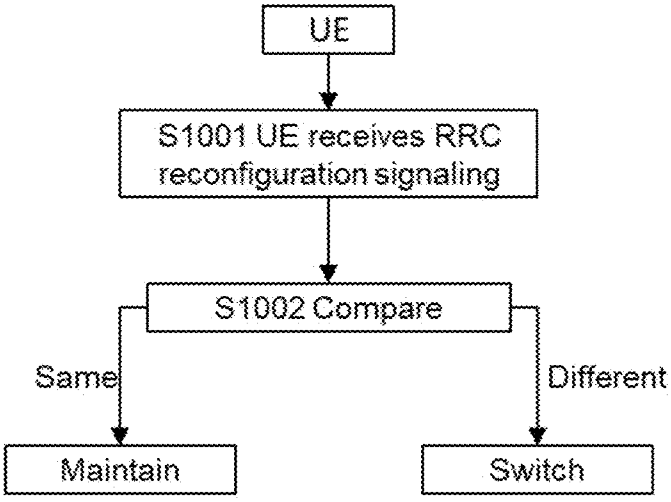
FIG. 10 is a schematic flow diagram showing active BWP switching by an electronic apparatus according to an embodiment of the present disclosure.

FIG. 10 is a schematic flow diagram showing active BWP switching by an electronic apparatus (UE) according to an embodiment of the present disclosure. In FIG. 10, no distinction between switching of the BWP for multicast and switching of the BWP for unicast is made.

As shown in FIG. 10, in S1001, the UE receives RRC reconfiguration signaling. In S1002, the UE compares configuration information of a BWP included in the RRC reconfiguration signaling with configuration information of a current BWP resource thereof. If they are the same, the current BWP resource thereof is maintained. If they are different, the current BWP resource thereof is switched to the BWP included in the RRC reconfiguration signaling.

Further, as mentioned in the embodiment of the managing electronic apparatus 100, the electronic apparatus may also perform timer-based BWP switching. The timer-based BWP switching is helpful for energy saving.

Figure 11:
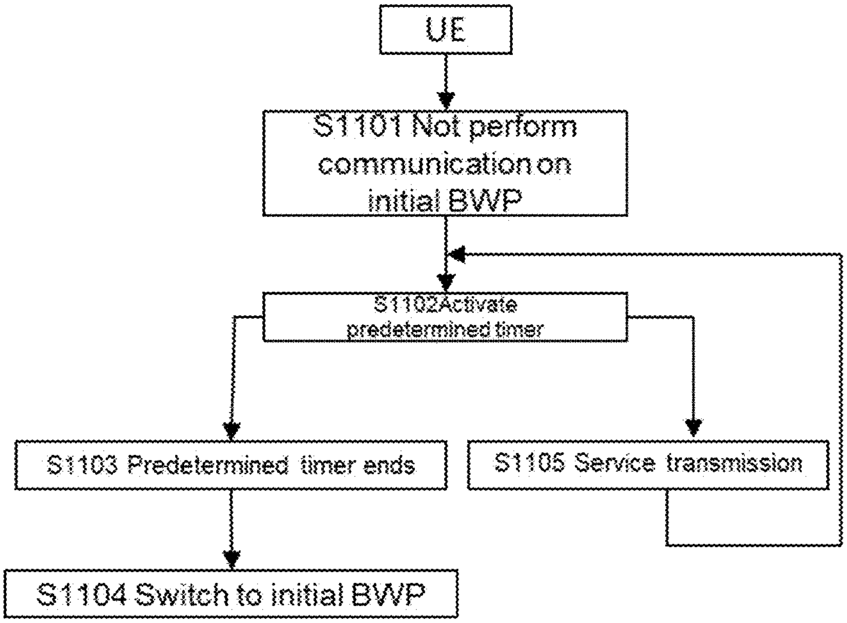
FIG. 11 is a schematic flow diagram showing timer-based BWP switching by an electronic apparatus according to an embodiment of the present disclosure.

FIG. 11 is a schematic flow diagram showing timer-based BWP switching by an electronic apparatus (UE) according to an embodiment of the present disclosure. In FIG. 11, no distinction between switching of the BWP for multicast and switching of the BWP for unicast is made.

As shown in FIG. 11, in S1101, it is judged that the UE does not perform communication on the initial BWP. In S1102, activation of a predetermined timer is started or restarted. In S1103, if service transmission is not performed within timing by the predetermined timer (for example, taking SCI as an index), the predetermined timer ends. Then, in S1104, the BWP is switched to the initial BWP. If, in S1105, service transmission is performed within timing by the predetermined timer, return to S1102.

The manner of active BWP switching and the manner of timer-based BWP switching may be used alone or in combination.

The present disclosure further provides a sending electronic apparatus 1200 for wireless communications.

Figure 12:
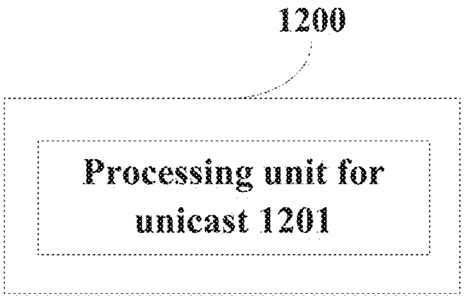
FIG. 12 shows a block diagram of functional modules of a sending electronic apparatus for wireless communications according to an embodiment of the present disclosure.

FIG. 12 shows a block diagram of functional modules of the sending electronic apparatus 1200 for wireless communications according to an embodiment of the present disclosure. As shown in FIG. 12, the sending electronic apparatus 1200 comprises a processing unit for unicast 1201, which selects a BWP resource from a plurality of BWPs, for unicast communication with a receiving electronic apparatus.

Wherein, the processing unit for unicast 1201 may be implemented by one or more processing circuitries which may be implemented as, for example, a chip.

The sending electronic apparatus 1200 may be arranged on user equipment (UE) side or communicably connected to user equipment, for example. It should also be noted herein that, the sending electronic apparatus 1200 may be implemented at chip level or at device level. For example, the sending electronic apparatus 1200 may work as user equipment itself, and may also include external devices such as a memory, a transceiver (not shown in the figure) and the like. The memory may be used to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be an eNB or gNB, for example.

Figure 13:
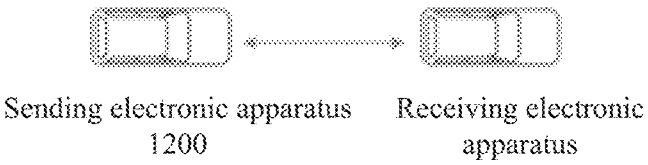
FIG. 13 is an exemplary diagram showing the sending electronic apparatus and a receiving electronic apparatus according to an embodiment of the present disclosure.

FIG. 13 is an exemplary diagram showing the sending electronic apparatus 1200 and a receiving electronic apparatus according to an embodiment of the present disclosure.

The sending electronic apparatus 1200 according to the embodiment of the present disclosure can select a BWP resource from a plurality of BWPs, so that different BWPs can be used for unicast communication, thereby making it possible to achieve at least one of: enhancing reliability of communication, reducing latency of communication, facilitating energy saving, and being capable of satisfying different types of service requirements.

As an example, the processing unit for unicast 1201 may select the BWP resource in a scenario of sidelink communication In the following, selecting the BWP resource by the sending electronic apparatus 1200 will be described mainly in conjunction with a scenario of 5G NR sidelink communication. However, those skilled in the art may understand that, the following description about selecting the BWP resource is not limited to the scenario of sidelink communication, but may be applied to other scenarios of selecting the BWP resource in 4G or 5G or other communication manners.

As an example, the plurality of BWPs are a first predetermined number of BWP sets, wherein each BWP set respectively includes the same initial BWP and a second predetermined number of BWPs differing from each other. For description of the first predetermined number of BWPs, please refer to the corresponding part of FIG. 2 for the managing electronic apparatus 100, which will not be repeatedly described here.

As an example, the processing unit for unicast 1201 may be configured to inform, when the unicast communication is established, the receiving electronic apparatus of configuration information of the first predetermined number of BWP sets through RRC connection request signaling, on the initial BWP. Thus, the receiving electronic apparatus may know the configuration information of the first predetermined number of BWP sets, so as to facilitate BWP reselection and switching that may occur in the future. The sending electronic apparatus 1200 and the receiving electronic apparatus may also exchange RRC parameters on the initial BWP.

As an example, the configuration information of the first predetermined number of BWP sets includes indicator information about the BWP sets and BWPs in each BWP set. For description of the indicator information, please refer to the corresponding part for the managing electronic apparatus 100, which will not be repeatedly described here.

As an example, the processing unit for unicast 1201 may be configured to inform the receiving electronic apparatus of configuration information of the selected BWP (e.g., indicator information of the selected BWP) through RRC reconfiguration signaling. Performing BWP switching through RRC reconfiguration signaling is the manner of active BWP switching as mentioned above.

The electronic apparatus for receiving compares the configuration information of the selected BWP with the configuration information of a current BWP resource of the receiving electronic apparatus, switches the current BWP resource to the selected BWP if they are not the same, and maintains the current BWP resource if they are the same.

As an example, the processing unit for unicast 1201 may be configured to receive a perception result from the receiving electronic apparatus for time-frequency resource blocks on the selected BWP, and to select, based on the perception result, a time-frequency resource pool used for the unicast communication.

As an example, the processing unit for unicast 1201 may be configured to receive a message that switching is successful on the selected BWP, that is fed back via SCI of the receiving electronic apparatus, and to perform the unicast communication based on the message. For example, the SCI is second phase SCI.

As an example, the processing unit for unicast 1201 may be configured to activate a predetermined timer in a case of not performing the unicast communication on the initial BWP, and to switch the selected BWP to the initial BWP if, within timing by the predetermined timer, the sending electronic apparatus 1200 sends no data and the receiving electronic apparatus receives no data. This timer-based BWP switching manner is helpful for energy saving. As described above, the manner of active BWP switching and the manner of timer-based BWP switching may be used alone or in combination.

Figure 14:
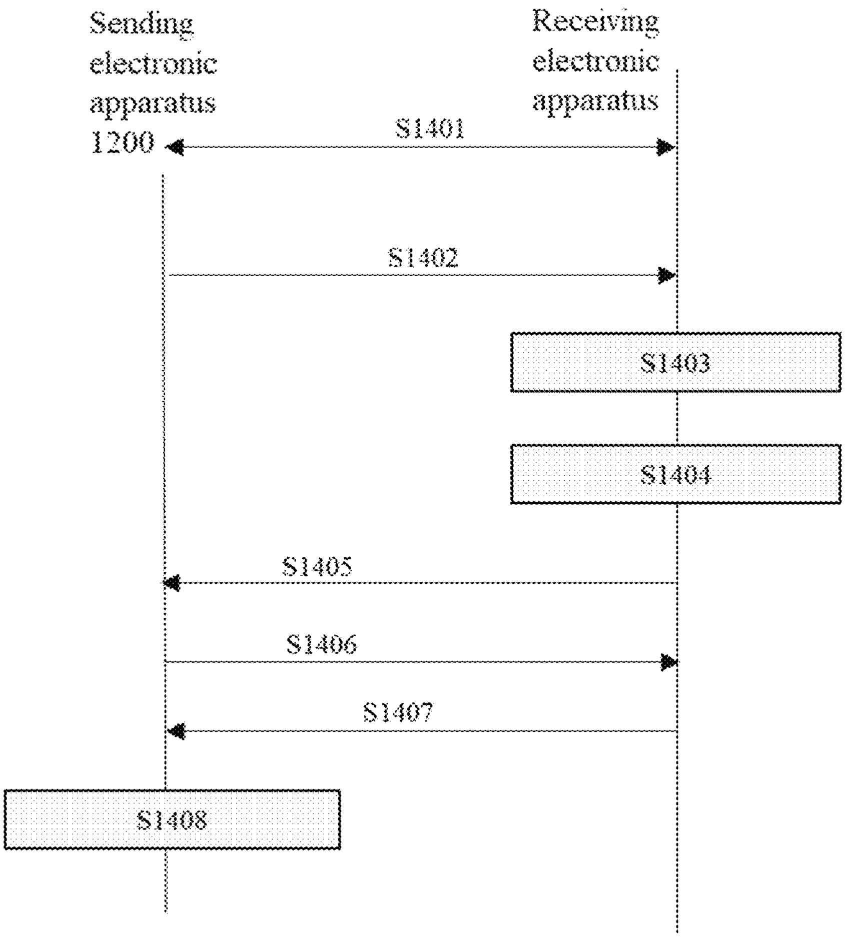
FIG. 14 is a diagram showing an example of information interaction for switching of the BWP for unicast between the sending electronic apparatus and the receiving electronic apparatus according to an embodiment of the present disclosure.

FIG. 14 is a diagram showing an example of information interaction for switching of the BWP for unicast between the sending electronic apparatus 1200 and the receiving electronic apparatus according to an embodiment of the present disclosure. For example, FIG. 14 shows an example of information interaction for switching of the BWP for unicast between the sending electronic apparatus 1200 and the receiving electronic apparatus in FIG. 13.

In S1401, the sending electronic apparatus 1200 informs the receiving electronic apparatus of configuration information of the first predetermined number of BWP sets through RRC connection request signaling, on the initial BWP, and the sending electronic apparatus 1200 and the receiving electronic apparatus also exchange RRC parameters on the initial BWP. In S1402, the sending electronic apparatus 1200 informs the receiving electronic apparatus of configuration information of the selected BWP through RRC reconfiguration signaling. In S1403, the receiving electronic apparatus compares the configuration information of the selected BWP resource with configuration information of a current BWP resource of the receiving electronic apparatus. In S1404, if the configuration information of the selected BWP resource is not the same as the configuration information of the current BWP resource of the receiving electronic apparatus, the current BWP resource is switched to the selected BWP, and if the configuration information of the selected BWP resource is the same as the configuration information of the current BWP resource of the receiving electronic apparatus, the current BWP resource is maintained. In S1405, the sending electronic apparatus 1200 receives a perception result from the receiving electronic apparatus for time-frequency resource blocks on the selected BWP. In S1406, the sending electronic apparatus 1200 selects, based on the perception result, a time-frequency resource pool used for the unicast communication, and informs the receiving electronic apparatus of configuration information of the time-frequency resource pool. In S1407, the sending electronic apparatus 1200 receives a message that switching is successful on the selected BWP, from the receiving electronic apparatus. In S1408, the sending electronic apparatus 1200 may perform the unicast communication with the receiving electronic apparatus.

In correspondence to the above-mentioned sending electronic apparatus 1200, the present disclosure further provides a receiving electronic apparatus 1500 for wireless communications.

Figure 15:
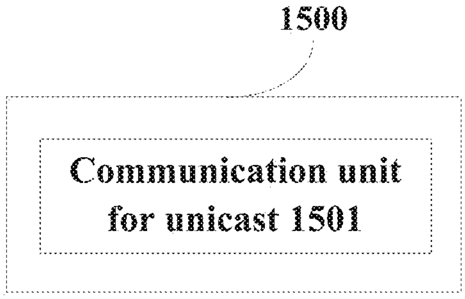
FIG. 15 shows a block diagram of functional modules of a receiving electronic apparatus for wireless communications according to an embodiment of the present disclosure.

FIG. 15 shows a block diagram of functional modules of the receiving electronic apparatus 1500 for wireless communications according to an embodiment of the present disclosure. As shown in FIG. 15, the receiving electronic apparatus 1500 comprises a communication unit for unicast 1501, which may be configured to receive, from a sending electronic apparatus, configuration information about a selected BWP resource determined from a plurality of BWPs, for unicast communication with the sending electronic apparatus.

Wherein, the communication unit for unicast 1501 may be implemented by one or more processing circuitries which may be implemented as, for example, a chip.

The receiving electronic apparatus 1500 may be arranged on user equipment (UE) side or communicably connected to user equipment, for example. It should also be noted herein that, the receiving electronic apparatus 1500 may be implemented at chip level or at device level. For example, the receiving electronic apparatus 1500 may work as user equipment itself, and may also include external devices such as a memory, a transceiver (not shown in the figure) and the like. The memory may be used to store programs and related data information that the user equipment needs to execute in order to implement various functions. The transceiver may include one or more communication interfaces to support communication with different devices (e.g., a base station, other user equipment, etc.), and the implementation form of the transceiver is not specifically limited here. The base station may be an eNB or gNB, for example.

A sending electronic apparatus corresponding to the receiving electronic apparatus 1500 may be the sending electronic apparatus 1200 as described above, for example.

The receiving electronic apparatus 1500 according to the embodiment of the present disclosure can receive a BWP resource determined from a plurality of BWPs, so that different BWPs can be used for unicast communication, thereby making it possible to achieve at least one of: enhancing reliability of communication, reducing latency of communication, facilitating energy saving, and being capable of satisfying different types of service requirements.

As an example, the communication unit for unicast 1501 may receive the selected BWP resource in a scenario of sidelink communication.

In the following, receiving the selected BWP resource by the receiving electronic apparatus 1500 will be described mainly in conjunction with a scenario of 5G NR sidelink communication. However, those skilled in the art may understand that, the following description about receiving the selected BWP resource is not limited to the scenario of sidelink communication, but may be applied to other scenarios of receiving the selected BWP resource in 4G or 5G or other communication manners.

As an example, the plurality of BWPs are a first predetermined number of BWP sets, wherein each BWP set respectively includes the same initial BWP and a second predetermined number of BWPs differing from each other. For description of the first predetermined number of BWPs, please refer to the corresponding part of FIG. 2 for the managing electronic apparatus 100, which will not be repeatedly described here.

As an example, the communication unit for unicast 1501 may be configured to receive configuration information of the first predetermined number of BWP sets, on the initial BWP, via Radio Resource Control, RRC, connection request signaling sent from the sending electronic apparatus. Thus, the receiving electronic apparatus 1500 may know the configuration information of the first predetermined number of BWP sets, so as to facilitate BWP reselection and switching that may occur in the future. The sending electronic apparatus and the receiving electronic apparatus 1500 may also exchange RRC parameters on the initial BWP.

As an example, the configuration information of the first predetermined number of BWP sets includes indicator information about the BWP sets and BWPs in each BWP set. For description of the indicator information, please refer to the corresponding part for the managing electronic apparatus 100, which will not be repeatedly described here.

As an example, the communication unit for unicast 1501 may be configured to receive configuration information of the selected BWP resource via RRC reconfiguration signaling sent from the sending electronic apparatus.

As an example, the communication unit for unicast 1501 may be configured to compare the configuration information of the selected BWP resource with the configuration information of a current BWP resource of the receiving electronic apparatus 1500, switch the current BWP resource to the selected BWP resource if they are not the same, and maintain the current BWP resource if they are the same.

As an example, the communication unit for unicast 1501 may be configured to report a perception result for time-frequency resource blocks on the selected BWP resource to the sending electronic apparatus, for the sending electronic apparatus to select, based on the perception result, a time-frequency resource block used for the unicast communication.

As an example, the communication unit for unicast 1501 may be configured to feed back a message that switching is successful on the selected BWP resource, to the sending electronic apparatus, via SCI. For example, the SCI is second phase SCI.

It should be noted that, the managing electronic apparatus in the present disclosure not only may serve as a managing electronic apparatus but also may serve as a member electronic apparatus, and the member electronic apparatus not only may serve as a member electronic apparatus but also may serve as a managing electronic apparatus. In the present disclosure, in a case where a managing function of an electronic apparatus is emphasized, the electronic apparatus is called a managing electronic apparatus, and in a case where a non-managing function of the electronic apparatus is emphasized, the electronic apparatus is called a member electronic apparatus. The sending electronic apparatus in the present disclosure may not only send data but also receive data, and the receiving electronic apparatus may not only receive data but also send data. In the present disclosure, in a case where a function of sending data of an electronic apparatus is emphasized, the electronic apparatus is called a sending electronic apparatus, and in a case where a function of receiving data of the electronic apparatus is emphasized, the electronic apparatus is called a receiving electronic apparatus.

In the process of describing the electronic apparatuses for wireless communications in the above implementations, some processing or methods obviously have also been disclosed. Hereinafter, an outline of these methods will be given without repeating some of the details that have been discussed above; however, it should be noted that, although these methods are disclosed in the process of describing electronic apparatuses for wireless communications, these methods do not necessarily employ those components as described or are not necessarily executed by those components. For example, the implementations of the electronic apparatuses for wireless communications may be partially or completely realized using hardware and/or firmware, while the methods for wireless communications discussed below may be completely implemented by a computer-executable program, although these methods may also employ hardware and/or firmware of the electronic apparatuses for wireless communications.

Figure 16:
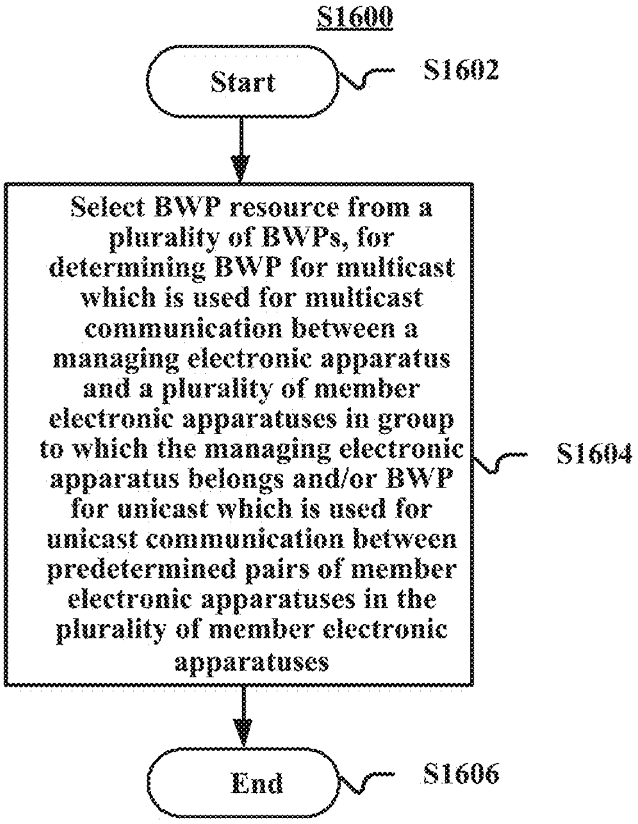
FIG. 16 is a flow diagram showing a method for wireless communications according to an embodiment of the present disclosure.

FIG. 16 is a flow diagram showing a method S1600 for wireless communications according to an embodiment of the present disclosure. The method S1600 starts in step S1602. In step S1604, a BWP resource is selected from a plurality of BWPs, for determining a BWP for multicast which is used for multicast communication between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses. The method S1600 ends in step S1606.

The method S1600 may be executed by, for example, the managing electronic apparatus 100. Please refer to the description at the above corresponding position in the embodiment of the managing electronic apparatus 100 for specific details of the method S1600, which will not be repeated here.

Figure 17:
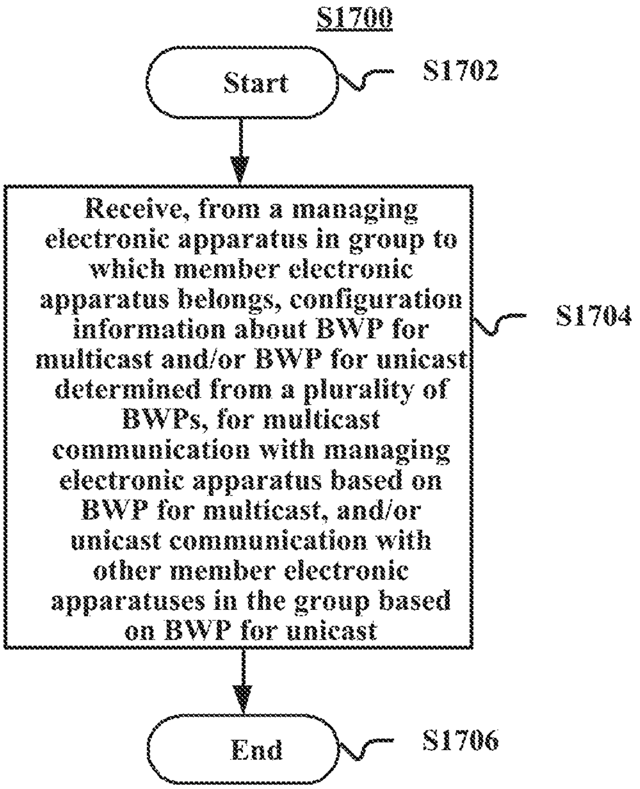
FIG. 17 is a flow diagram showing a method for wireless communications according to an embodiment of the present disclosure.

FIG. 17 is a flow diagram showing a method S1700 for wireless communications according to an embodiment of the present disclosure. The method S1700 starts in step S1702. In step S1704, configuration information about a BWP for multicast and/or BWP for unicast determined from a plurality of BWPs is received from a managing electronic apparatus in a group to which the member electronic apparatus belongs, for multicast communication with the managing electronic apparatus based on the BWP for multicast, and/or unicast communication with other member electronic apparatuses in the group based on the BWP for unicast. The method S1700 ends in step S1706.

The method S1700 may be executed by, for example, the member electronic apparatus 9000. Please refer to the description at the above corresponding position in the embodiment of the member electronic apparatus 9000 for specific details of the method S1700, which will not be repeated here.

Figure 18:
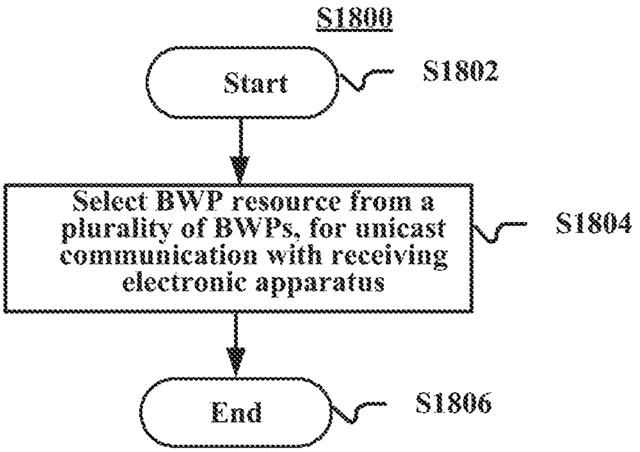
FIG. 18 is a flow diagram showing a method for wireless communications according to another embodiment of the present disclosure.

FIG. 18 shows a flowchart of a method S1800 for wireless communications according to another embodiment of the present application. The method S1800 starts in step S1802. In step S1804, a BWP resource is selected from a plurality of BWPs, for unicast communication with a receiving electronic apparatus. The method S1800 ends in step S1806.

The method S1800 may be executed by, for example, the sending electronic apparatus 1200. Please refer to the description at the above corresponding position in the embodiment of the sending electronic apparatus 1200 for specific details of the method S1800, which will not be repeated here.

Figure 19:
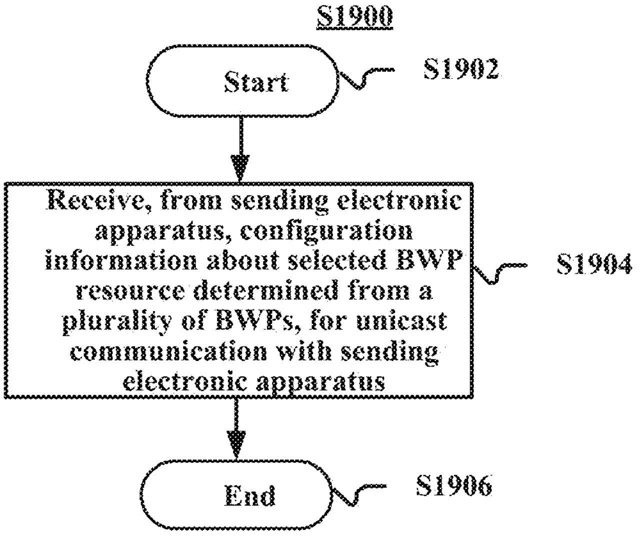
FIG. 19 is a flow diagram showing a method for wireless communications according to another embodiment of the present disclosure.

FIG. 19 shows a flowchart of a method S1900 for wireless communications according to another embodiment of the present application. The method S1900 starts in step S1902. In step S1904, configuration information about a selected BWP resource determined from a plurality of BWPs is received from a sending electronic apparatus, for unicast communication with the sending electronic apparatus. The method S1900 ends in step S1906.

The method S1900 may be executed by, for example, the receiving electronic apparatus 1500. Please refer to the description at the above corresponding position in the embodiment of the receiving electronic apparatus 1500 for specific details of the method S1900, which will not be repeated here.

The technology of the present disclosure can be applied to various products.

The managing electronic apparatus 100, the member electronic apparatus 9000, the sending electronic apparatus 1200 and the receiving electronic apparatus 1500 may be implemented as various user equipment. The user equipment may be implemented as a mobile terminal (such as a smart phone, a tablet personal computer (PC), a notebook PC, a portable game terminal, a portable/dongle type mobile router, and a digital camera) or a vehicle-mounted terminal (such as an automobile navigation device). The user equipment may also be implemented as a terminal (also referred to as a machine type communication (MTC) terminal) that executes Machine-to-Machine (M2M) communications. In addition, the user equipment may be a wireless communication module (such as an integrated circuit module including a single chip) installed on each of the above-mentioned terminals.

[Application Examples About Base Station]

First Application Example

Figure 20:
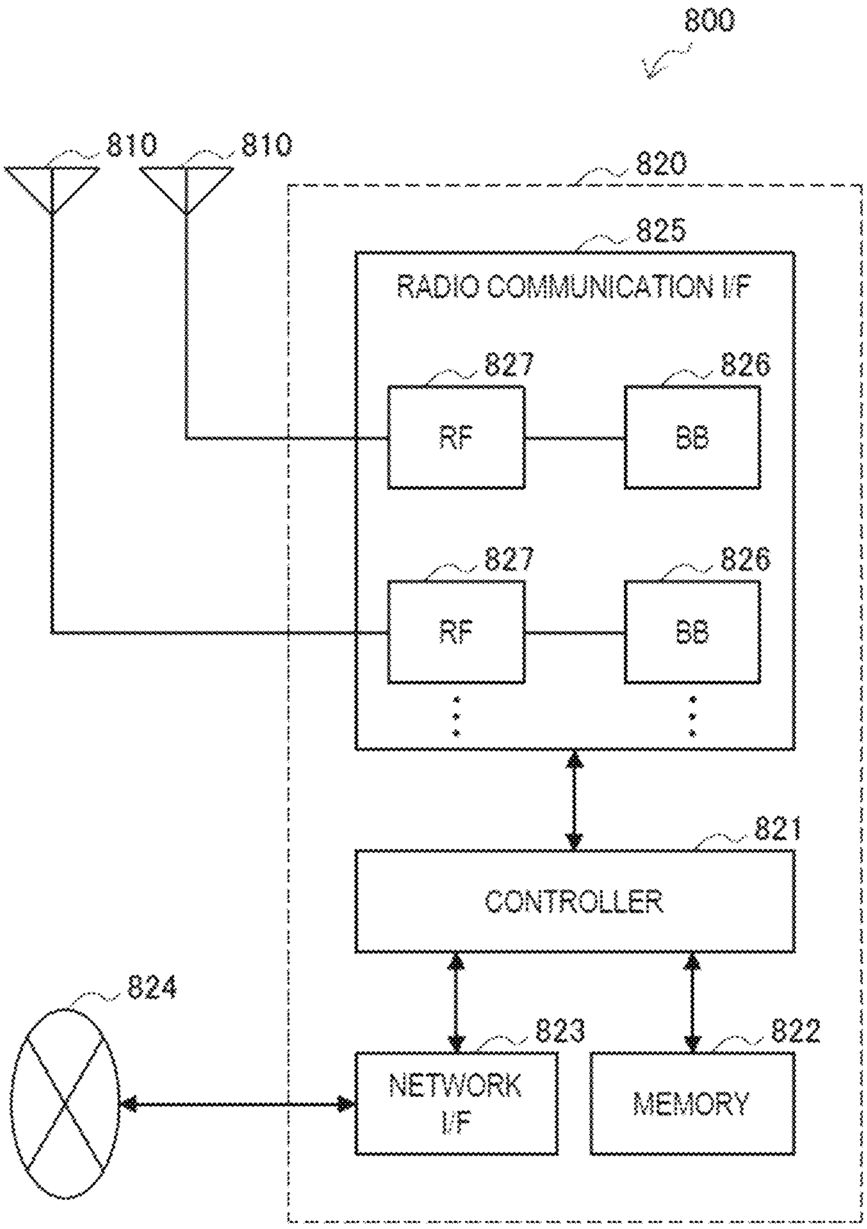
FIG. 20 is a block diagram showing a first example of a schematic configuration of an eNB or gNB to which the technology of the present disclosure can be applied.

FIG. 20 is a block diagram showing a first example of a schematic configuration of an eNB or gNB to which the technology of the present disclosure can be applied. Note that, the following description takes an eNB as an example, but it may also be applied to a gNB. An eNB 800 includes one or more antennas 810 and base station equipment 820. The base station equipment 820 and each antenna 810 may be connected to each other via an RF cable.

Each of the antennas 810 includes a single or multiple antenna elements (such as multiple antenna elements included in a Multi-Input Multi-Output (MIMO) antenna), and is used for the base station equipment 820 to transmit and receive wireless signals. As shown in FIG. 20, the eNB 800 may include multiple antennas 810. For example, the multiple antennas 810 may be compatible with multiple frequency bands used by the eNB 800. Although FIG. 20 shows an example in which the eNB 800 includes multiple antennas 810, the eNB 800 may also include a single antenna 810.

The base station equipment 820 includes a controller 821, a memory 822, a network interface (I/F) 823, and a radio communication interface 825.

The controller 821 may be, for example, a CPU or a DSP, and manipulate various functions of a higher layer of the base station equipment 820. For example, the controller 821 generates a data packet based on data in a signal processed by the radio communication interface 825, and transfers the generated packet via the network interface 823. The controller 821 may bundle data from multiple baseband processors to generate a bundled packet, and transfer the generated bundled packet. The controller 821 may have a logical function for performing control such as radio resource control, radio bearer control, mobility management, admission control, and scheduling. The control may be executed in conjunction with nearby eNBs or core network nodes. The memory 822 includes an RAM and an ROM, and stores programs executed by the controller 821 and various types of control data (such as a terminal list, transmission power data, and scheduling data).

The network interface 823 is a communication interface for connecting the base station equipment 820 to a core network 824. The controller 821 may communicate with the core network node or another eNB via the network interface 823. In this case, the eNB 800 and the core network node or other eNBs may be connected to each other through a logical interface (such as an S1 interface and an X2 interface). The network interface 823 may also be a wired communication interface, or a wireless communication interface for a wireless backhaul line. If the network interface 823 is a wireless communication interface, the network interface 823 may use a higher frequency band for wireless communications than the frequency band used by the radio communication interface 825.

The radio communication interface 825 supports any cellular communication scheme (such as Long Term Evolution (LTE) and LTE-Advanced), and provides wireless connection to a terminal located in a cell of the eNB 800 via an antenna 810. The radio communication interface 825 may generally include, for example, a baseband (BB) processor 826 and an RF circuit 827. The BB processor 826 may execute, for example, encoding/decoding, modulation/demodulation, and multiplexing/demultiplexing, and execute various types of signal processing of layers (e.g., L1, Medium Access Control (MAC), Radio Link Control (RLC), and Packet Data Convergence Protocol (PDCP)). Instead of the controller 821, the BB processor 826 may have a part or all of the above-mentioned logical functions. The BB processor 826 may be a memory storing a communication control program, or a module including a processor and related circuits configured to execute the program. An update program may cause the function of the BB processor 826 to be changed. The module may be a card or blade inserted into a slot of the base station equipment 820. Alternatively, the module may also be a chip mounted on a card or blade. Meanwhile, the RF circuit 827 may include, for example, a mixer, a filter, and an amplifier, and transmit and receive a wireless signal via the antenna 810.

As shown in FIG. 20, the radio communication interface 825 may include multiple BB processors 826. For example, the multiple BB processors 826 may be compatible with multiple frequency bands used by the eNB 800. As shown in FIG. 20, the radio communication interface 825 may include multiple RF circuits 827. For example, the multiple RF circuits 827 may be compatible with multiple antenna elements. Although FIG. 20 shows an example in which the radio communication interface 825 includes multiple BB processors 826 and multiple RF circuits 827, the radio communication interface 825 may also include a single BB processor 826 or a single RF circuit 827.

In the eNB 800 as shown in FIG. 20, the transceiver may be implemented by a radio communication interface 825. At least a part of the function may also be implemented by the controller 821.

Second Application Example

Figure 21:
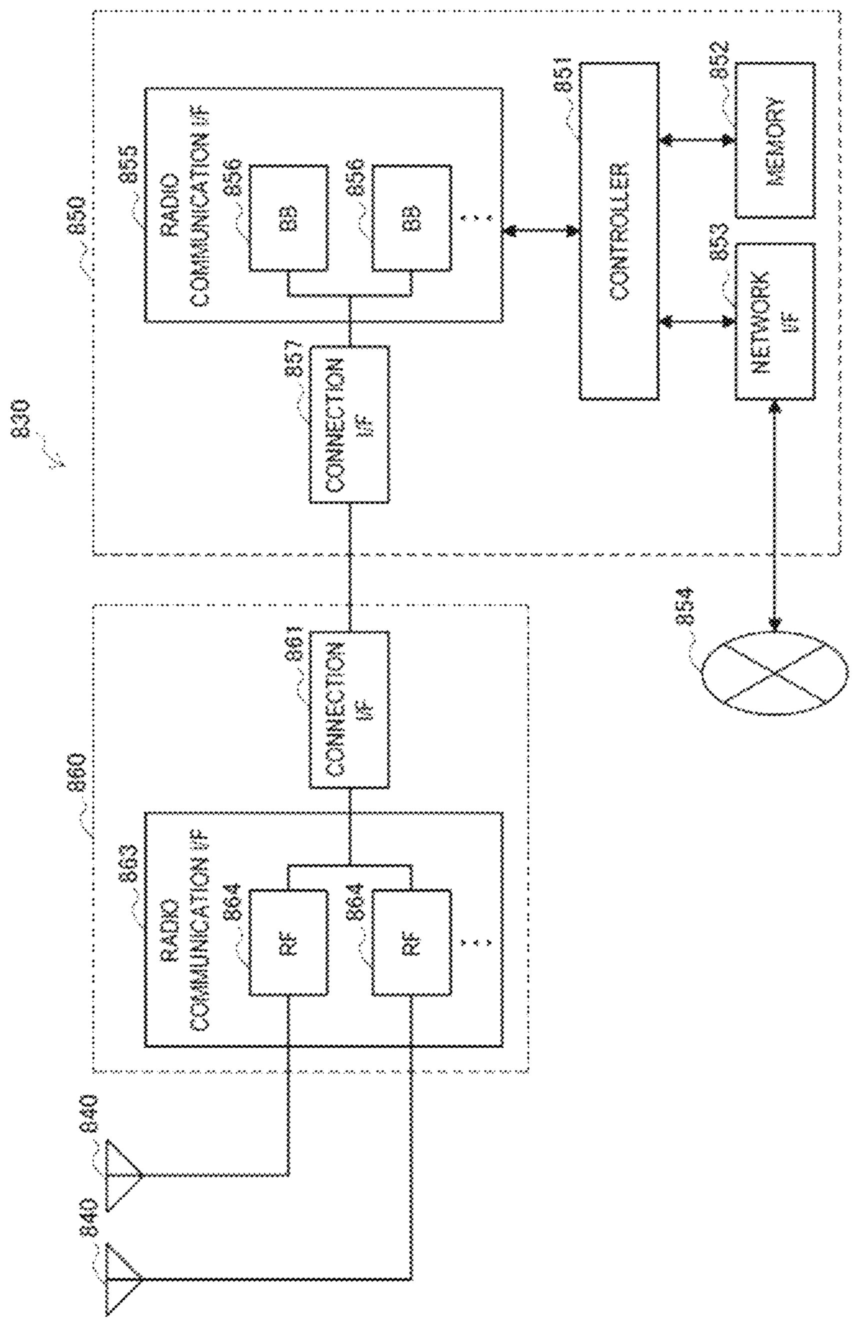
FIG. 21 is a block diagram showing a second example of a schematic configuration of an eNB or gNB to which the technology of the present disclosure can be applied.

FIG. 21 is a block diagram showing a second example of a schematic configuration of an eNB or gNB to which the technology of the present disclosure can be applied. Note that similarly, the following description takes an eNB as an example, but it may also be applied to a gNB. An eNB 830 includes one or more antennas 840, base station equipment 850, and an RRH 860. The RRH 860 and each antenna 840 may be connected to each other via an RF cable. The base station equipment 850 and the RRH 860 may be connected to each other via a high-speed line such as an optical fiber cable.

Each of the antennas 840 includes a single or multiple antenna elements (such as multiple antenna elements included in a MIMO antenna) and is used for the RRH 860 to transmit and receive a wireless signal. As shown in FIG. 21, the eNB 830 may include multiple antennas 840. For example, the multiple antennas 840 may be compatible with multiple frequency bands used by the eNB 830. Although FIG. 21 shows an example in which the eNB 830 includes multiple antennas 840, the eNB 830 may also include a single antenna 840.

The base station equipment 850 includes a controller 851, a memory 852, a network interface 853, a radio communication interface 855, and a connection interface 857. The controller 851, the memory 852, and the network interface 853 are the same as the controller 821, the memory 822, and the network interface 823 as described with reference to FIG. 20.

The radio communication interface 855 supports any cellular communication scheme (such as LTE and LTE-Advanced), and provides wireless communications to a terminal located in a sector corresponding to the RRH 860 via the RRH 860 and the antenna 840. The radio communication interface 855 may generally include, for example, a BB processor 856. The BB processor 856 is the same as the BB processor 826 as described with reference to FIG. 20 except that the BB processor 856 is connected to the RF circuit 864 of the RRH 860 via the connection interface 857. As shown in FIG. 21, the radio communication interface 855 may include multiple BB processors 856. For example, the multiple BB processors 856 may be compatible with multiple frequency bands used by the eNB 830. Although FIG. 21 shows an example in which the radio communication interface 855 includes multiple BB processors 856, the radio communication interface 855 may also include a single BB processor 856.

The connection interface 857 is an interface for connecting the base station equipment 850 (radio communication interface 855) to the RRH 860. The connection interface 857 may also be a communication module for communication in the above-mentioned high-speed line that connects the RRH 860 to the base station equipment 850 (radio communication interface 855).

The RRH 860 includes a connection interface 861 and a radio communication interface 863.

The connection interface 861 is an interface for connecting the RRH 860 (radio communication interface 863) to the base station equipment 850. The connection interface 861 may also be a communication module for communication in the above-mentioned high-speed line.

The radio communication interface 863 transfers and receives wireless signals via the antenna 840. The radio communication interface 863 may generally include, for example, an RF circuit 864. The RF circuit 864 may include, for example, a mixer, a filter, and an amplifier, and transfer and receive wireless signals via the antenna 840. As shown in FIG. 21, the radio communication interface 863 may include multiple RF circuits 864. For example, the multiple RF circuits 864 may support multiple antenna elements. Although FIG. 21 shows an example in which the radio communication interface 863 includes multiple RF circuits 864, the radio communication interface 863 may also include a single RF circuit 864.

In the eNB 830 as shown in FIG. 21, the transceiver may be implemented by the radio communication interface 825. At least a part of the function may also be implemented by the controller 851.

[Application Example About User Equipment]

First Application Example

Figure 22:
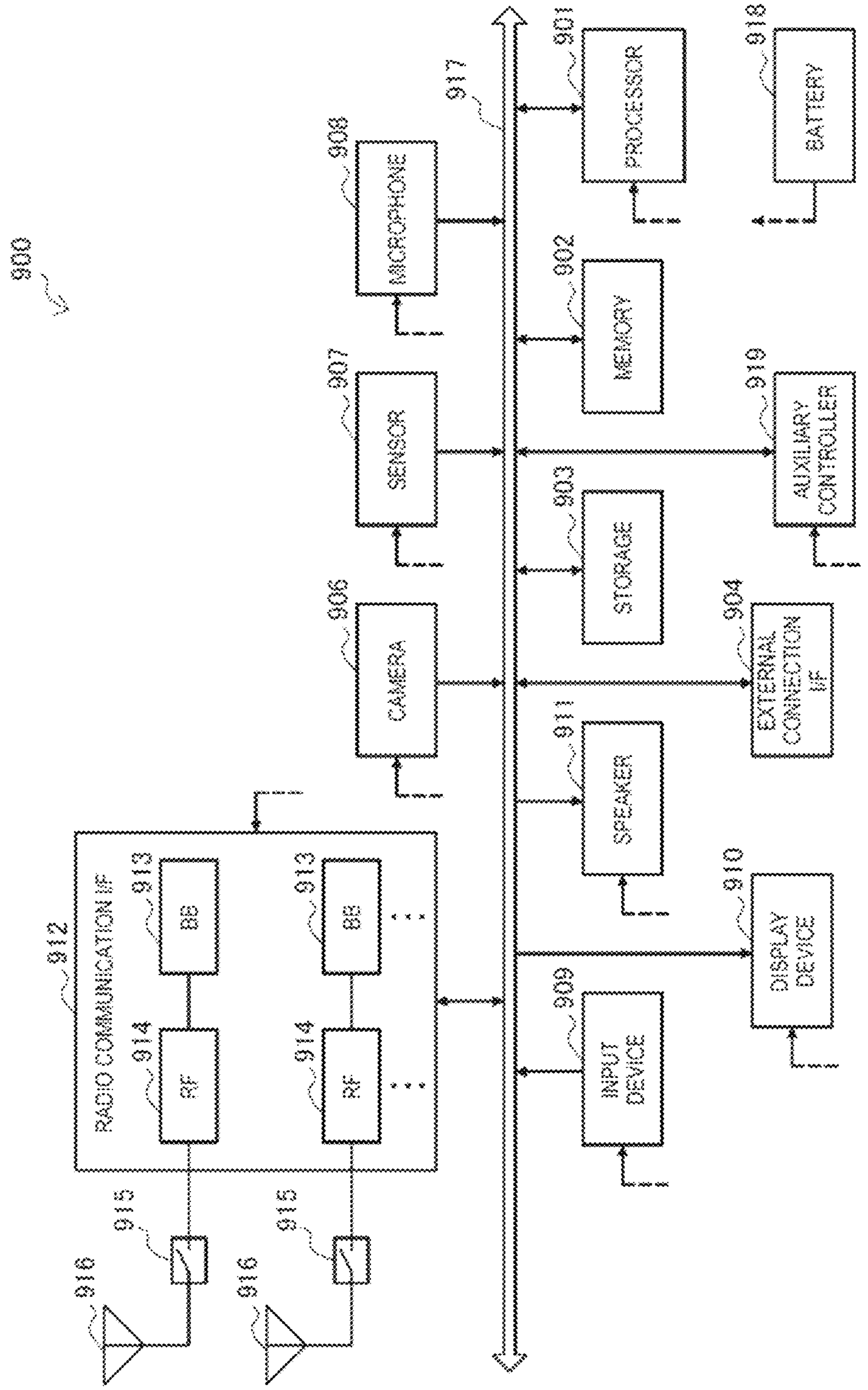
FIG. 22 is a block diagram showing an example of a schematic configuration of a smart phone to which the technology of the present disclosure can be applied.

FIG. 22 is a block diagram showing an example of a schematic configuration of a smart phone to which the technology of the present disclosure can be applied. The smart phone 900 includes a processor 901, a memory 902, a storage 903, an external connection interface 904, an camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls the functions of the application layer and other layers of the smart phone 900. The memory 902 includes an RAM and an ROM, and stores data and programs executed by the processor 901. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetic sensor, and an acceleration sensor. The microphone 908 converts sound input to the smart phone 900 into an audio signal. The input device 909 includes, for example, a touch sensor, a keypad, a keyboard, a button, or a switch configured to detect a touch on a screen of the display device 910, and receives an operation or information input from the user. The display device 910 includes a screen (such as a liquid crystal display (LCD) and an organic light emitting diode (OLED) display), and displays an output image of the smart phone 900. The speaker 911 converts the audio signal output from the smart phone 900 into sound.

The radio communication interface 912 supports any cellular communication scheme (such as LTE and LTE-Advanced), and executes wireless communications. The radio communication interface 912 may generally include, for example, a BB processor 913 and an RF circuit 914. The BB processor 913 may execute, for example, encoding/decoding, modulation/demodulation, and multiplexing/demultiplexing, and execute various types of signal processing for wireless communications. Meanwhile, the RF circuit 914 may include, for example, a mixer, a filter, and an amplifier, and transmit and receive wireless signals via the antenna 916. Note that, although the figure shows a circumstance where one RF link is connected with one antenna, this is only schematic, and a circumstance where one RF link is connected with multiple antennas through multiple phase shifters is also included. The radio communication interface 912 may be a chip module on which the BB processor 913 and the RF circuit 914 are integrated. As shown in FIG. 22, the radio communication interface 912 may include multiple BB processors 913 and multiple RF circuits 914. Although FIG. 22 shows an example in which the radio communication interface 912 includes multiple BB processors 913 and multiple RF circuits 914, the radio communication interface 912 may also include a single BB processor 913 or a single RF circuit 914.

Furthermore, in addition to the cellular communication scheme, the radio communication interface 912 may support other types of wireless communication schemes, such as a short-range wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches a connection destination of the antenna 916 among multiple circuits included in the radio communication interface 912 (e.g., circuits for different wireless communication schemes).

Each of the antennas 916 includes a single or multiple antenna elements (such as multiple antenna elements included in a MIMO antenna), and is used for the radio communication interface 912 to transmit and receive wireless signals. As shown in FIG. 22, the smart phone 900 may include multiple antennas 916. Although FIG. 22 shows an example in which the smart phone 900 includes multiple antennas 916, the smart phone 900 may also include a single antenna 916.

Furthermore, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smart phone 900 as shown in FIG. 22 via a feeder line, which is partially shown as a dashed line in the figure. The auxiliary controller 919 manipulates the least necessary function of the smart phone 900 in a sleep mode, for example.

In the smart phone 900 as shown in FIG. 22, in a case where the managing electronic apparatus, the member electronic apparatus, the sending electronic apparatus and the receiving electronic apparatus according to the embodiments of the present disclosure are implemented as being used as a smart phone of user equipment, the transceiver of the above managing electronic apparatus, member electronic apparatus, sending electronic apparatus and receiving electronic apparatus may be implemented by the radio communication interface 912. At least a part of the function may also be implemented by the processor 901 or the auxiliary controller 919. For example, the processor 901 or the auxiliary controller 919 may be used to determine a BWP for multicast and/or BWP for unicast.

Second Application Example

Figure 23:
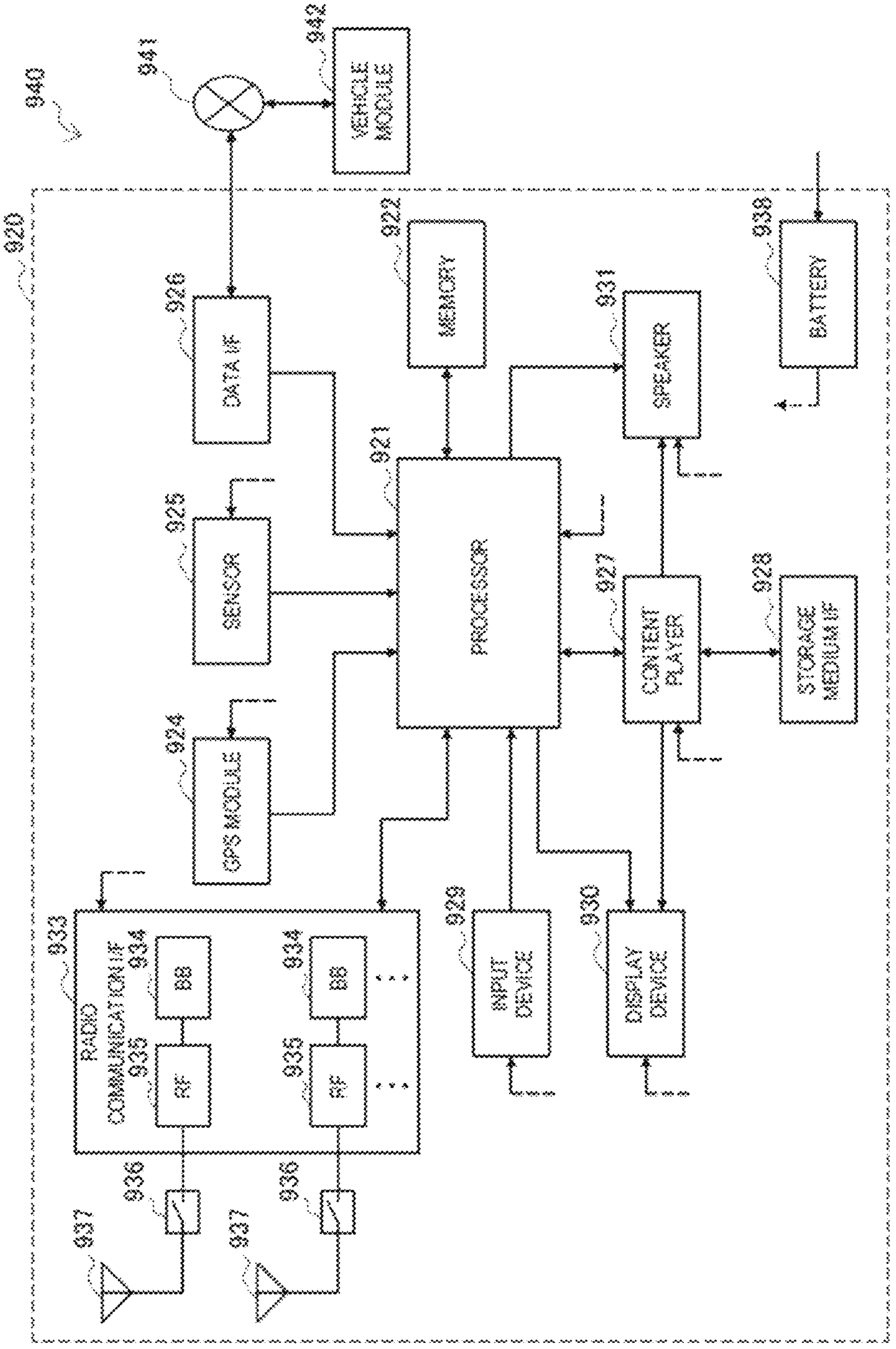
FIG. 23 is a block diagram showing an example of a schematic configuration of automobile navigation equipment to which the technology of the present disclosure can be applied.

FIG. 23 is a block diagram showing an example of a schematic configuration of automobile navigation equipment to which the technology of the present disclosure can be applied. The automobile navigation equipment 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function of the automobile navigation equipment 920 and additional functions. The memory 922 includes an RAM and an ROM, and stores data and programs executed by the processor 921.

The GPS module 924 uses a GPS signal received from a GPS satellite to measure a position of the automobile navigation equipment 920 (such as latitude, longitude, and altitude). The sensor 925 may include a group of sensors, such as a gyro sensor, a geomagnetic sensor, and an air pressure sensor. The data interface 926 is connected to, for example, an in-vehicle network 941 via a terminal not shown, and acquires data (such as vehicle speed data) generated by a vehicle.

The content player 927 reproduces content stored in a storage medium (such as a CD and a DVD), which is inserted into the storage medium interface 928. The input device 929 includes, for example, a touch sensor, a button, or a switch configured to detect a touch on a screen of the display device 930, and receives an operation or information input from the user. The display device 930 includes a screen such as an LCD or OLED display, and displays an image of a navigation function or reproduced content. The speaker 931 outputs the sound of the navigation function or the reproduced content.

The radio communication interface 933 supports any cellular communication scheme, such as LTE and LTE-Advanced, and executes wireless communication. The radio communication interface 933 may generally include, for example, a BB processor 934 and an RF circuit 935. The BB processor 934 may execute, for example, encoding/decoding, modulation/demodulation, and multiplexing/demultiplexing, and execute various types of signal processing for wireless communications. Meanwhile, the RF circuit 935 may include, for example, a mixer, a filter, and an amplifier, and transmit and receive wireless signals via the antenna 937. The radio communication interface 933 may also be a chip module on which the BB processor 934 and the RF circuit 935 are integrated. As shown in FIG. 23, the radio communication interface 933 may include multiple BB processors 934 and multiple RF circuits 935. Although FIG. 23 shows an example in which the radio communication interface 933 includes multiple BB processors 934 and multiple circuits 935, the radio communication interface 933 may also include a single BB processor 934 or a single RF circuit 935.

Furthermore, in addition to the cellular communication scheme, the radio communication interface 933 may support types of wireless communication schemes, such as a short-range wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches a connection destination of the antenna 937 among multiple circuits included in the radio communication interface 933 (e.g., circuits for different wireless communication schemes).

Each of the antennas 937 includes a single or multiple antenna elements (such as multiple antenna elements included in a MIMO antenna), and is used for the radio communication interface 933 to transmit and receive wireless signals. As shown in FIG. 23, the automobile navigation equipment 920 may include multiple antennas 937. Although FIG. 23 shows an example in which the automobile navigation equipment 920 includes multiple antennas 937, the automobile navigation equipment 920 may also include a single antenna 937.

Furthermore, the automobile navigation equipment 920 may include an antenna 937 for each wireless communication scheme. In this case, the antenna switch 936 may be omitted from the configuration of the automobile navigation equipment 920.

The battery 938 supplies power to each block of the automobile navigation equipment 920 as shown in FIG. 23 via a feeder line, which is partially shown as a dashed line in the figure. The battery 938 accumulates electric power supplied from the vehicle.

In the automobile navigation equipment 920 as shown in FIG. 23, in a case where the managing electronic apparatus, the member electronic apparatus, the sending electronic apparatus and the receiving electronic apparatus according to the embodiments of the present disclosure are implemented as being used as automobile navigation equipment of user equipment, the transceiver of the above managing electronic apparatus, member electronic apparatus, sending electronic apparatus and receiving electronic apparatus may be implemented by the radio communication interface 933. At least a part of the function may also be implemented by the processor 921. For example, the processor 921 may be used to determine a BWP for multicast and/or BWP for unicast.

The technology of the present disclosure may also be implemented as an in-vehicle system (or vehicle) 940 including one or more blocks in the automobile navigation equipment 920, the in-vehicle network 941, and the vehicle module 942. The vehicle module 942 generates vehicle data (such as vehicle speed, engine speed, and failure information), and outputs the generated data to the in-vehicle network 941.

The basic principle of the present invention has been described above in conjunction with specific embodiments. However, it should be pointed out that, for those skilled in the art, it could be understood that all or any step or component of the methods and devices of the present invention may be implemented in any computing device (including processors, storage media, etc.) or network of computing devices in the form of hardware, firmware, software, or a combination thereof. This can be achieved by those skilled in the art utilizing their basic circuit design knowledge or basic programming skills after reading the description of the present invention.

Moreover, the present invention also proposes a program product storing a machine-readable instruction code that, when read and executed by a machine, can execute the above-mentioned methods according to the embodiments of the present invention.

Accordingly, a storage medium for carrying the above-mentioned program product storing a machine-readable instruction code is also included in the disclosure of the present invention. The storage medium includes, but is not limited to, a floppy disk, an optical disk, a magneto-optical disk, a memory card, a memory stick, etc.

Figure 24:
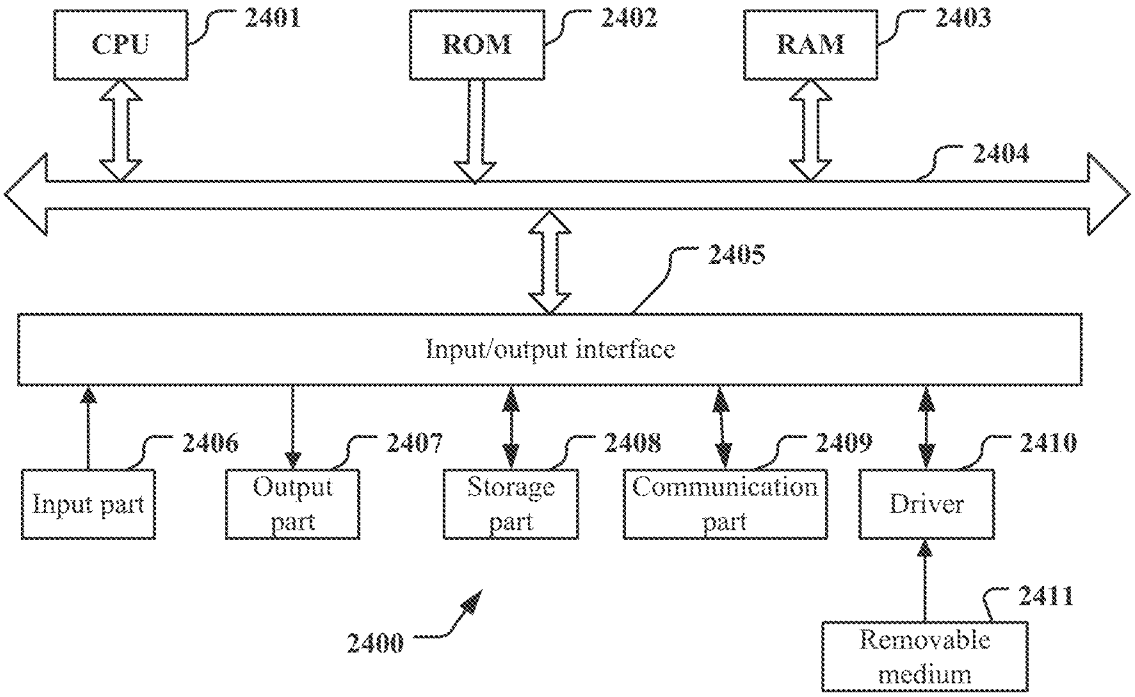
FIG. 24 is a block diagram of an exemplary structure of a universal personal computer in which the methods and/or apparatuses and/or systems according to the embodiments of the present invention can be implemented.

In a case where the present invention is implemented by software or firmware, a program constituting the software is installed from a storage medium or a network to a computer with a dedicated hardware structure (e.g., a general-purpose computer 2400 as shown in FIG. 24), and the computer, when installed with various programs, can execute various functions and the like.

In FIG. 24, a central processing unit (CPU) 2401 executes various processing in accordance with a program stored in a read only memory (ROM) 2402 or a program loaded from a storage part 2408 to a random access memory (RAM) 2403. In the RAM 2403, data required when the CPU 2401 executes various processing and the like is also stored as needed. The CPU 2401, the ROM 2402, and the RAM 2403 are connected to each other via a bus 2404. The input/output interface 2405 is also connected to the bus 2604.

The following components are connected to the input/output interface 2405: an input part 2406 (including a keyboard, a mouse, etc.), an output part 2407 (including a display, such as a cathode ray tube (CRT), a liquid crystal display (LCD), etc., and a speaker, etc.), a storage part 2408 (including a hard disk, etc.), and a communication part 2409 (including a network interface card such as an LAN card, a modem, etc.). The communication part 2409 executes communication processing via a network such as the Internet. The driver 2410 may also be connected to the input/output interface 2405, as needed. A removable medium 2411 such as a magnetic disk, an optical disk, a magneto-optical disk, a semiconductor memory and the like is installed on the driver 2410 as needed, so that a computer program read out therefrom is installed into the storage part 2408 as needed.

In a case where the above-mentioned series of processing is implemented by software, a program constituting the software is installed from a network such as the Internet or a storage medium such as the removable medium 2411.

Those skilled in the art should understand that, this storage medium is not limited to the removable medium 2411 as shown in FIG. 24 which has a program stored therein and which is distributed separately from an apparatus to provide the program to users. Examples of the removable media 2411 include magnetic disks (including a floppy disk (registered trademark)), an optical disk (including a compact disk read-only memory (CD-ROM) and a digital versatile disk (DVD)), a magneto-optical disk (including a mini disk (MD) (registered trademark)), and a semiconductor memory. Alternatively, the storage medium may be the ROM 2402, a hard disk included in the storage part 2408, etc., which have programs stored therein and which are distributed concurrently with the apparatus including them to users.

It should also be pointed out that in the devices, methods and systems of the present invention, each component or each step may be decomposed and/or recombined. These decompositions and/or recombinations should be regarded as equivalent solutions of the present invention. Moreover, the steps of executing the above-mentioned series of processing may naturally be executed in chronological order in the order as described, but do not necessarily need to be executed in chronological order. Some steps may be executed in parallel or independently of each other.

Finally, it should be noted that, the terms "include", "comprise" or any other variants thereof are intended to cover non-exclusive inclusion, so that a process, method, article or apparatus that includes a series of elements not only includes those elements, but also includes other elements that are not explicitly listed, or but also includes elements inherent to such a process, method, article, or apparatus. Furthermore, in the absence of more restrictions, an element defined by sentence "including one . . . " does not exclude the existence of other identical elements in a process, method, article, or apparatus that includes the element.

Although the embodiments of the present invention have been described above in detail in conjunction with the accompanying drawings, it should be appreciated that, the above-described embodiments are only used to illustrate the present invention and do not constitute a limitation to the present invention. For those skilled in the art, various modifications and changes may be made to the above-mentioned embodiments without departing from the essence and scope of the present invention. Therefore, the scope of the present invention is defined only by the appended claims and equivalent meanings thereof.

This technology can also be implemented as follows.

Appendix 1. A managing electronic apparatus for wireless communications, comprising:

processing circuitry configured to:

select a bandwidth part, BWP, resource from a plurality of BWPs, for determining a BWP for multicast which is used for multicast communication between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses.

Appendix 2. The managing electronic apparatus according to Appendix 1, wherein the plurality of BWPs are a first predetermined number of BWP sets, wherein each BWP set respectively includes the same initial BWP and a second predetermined number of BWPs differing from each other.

Appendix 3. The managing electronic apparatus according to Appendix 2, wherein the processing circuitry is configured to inform, when the group is established, the plurality of member electronic apparatuses of configuration information of the first predetermined number of BWP sets through Radio Resource Control, RRC, connection request signaling, on the initial BWP.

Appendix 4. The managing electronic apparatus according to Appendix 3, wherein the configuration information of the first predetermined number of BWP sets includes indicator information about the BWP sets and BWPs in each BWP set.

Appendix 5. The managing electronic apparatus according to any one of Appendixes 1 to 4, wherein the managing electronic apparatus is within coverage of a network side equipment that provides services thereto.

Appendix 6. The managing electronic apparatus according to Appendix 5, wherein the processing circuitry is configured to receive indication information from the network side equipment through control signaling, the indication information indicating whether the managing electronic apparatus can independently determine the BWP for multicast.

Appendix 7. The managing electronic apparatus according to Appendix 6, wherein the control signaling includes Downlink Control Information, DCI.

Appendix 8. The managing electronic apparatus according to Appendix 6 or 7, wherein the processing circuitry is configured to report, in a case where the indication information indicates that the managing electronic apparatus cannot independently determine the BWP for multicast, configuration information of a BWP resource used for the multicast communication that is selected by the managing electronic apparatus, and configuration information of at least one candidate BWP resource that can be used for the multicast communication in the plurality of BWPs, to the network side equipment.

Appendix 9. The managing electronic apparatus according to Appendix 8, wherein the processing circuitry is configured to perform the reporting through a Physical Uplink Shared Channel, PUSCH.

Appendix 10. The managing electronic apparatus according to Appendix 8 or 9, wherein the processing circuitry is configured to receive a BWP resource fed back from the network side equipment, and to determine the fed back BWP resource as the BWP for multicast, wherein the fed back BWP resource is a BWP resource used for the multicast communication that is selected by the managing electronic apparatus, or a BWP resource that is selected by the network side equipment from the at least one candidate BWP resource.

Appendix 11. The managing electronic apparatus according to Appendix 10, wherein the processing circuitry is configured to receive the fed back BWP resource through a Physical Downlink Shared Channel, PDSCH.

Appendix 12. The managing electronic apparatus according to Appendix 6 or 7, wherein the processing circuitry is configured to determine, in a case where the indication information indicates that the managing electronic apparatus can independently determine the BWP for multicast, a BWP resource used for the multicast communication that is selected by the managing electronic apparatus, as the BWP for multicast.

Appendix 13. The managing electronic apparatus according to any one of Appendixes 5 to 12, wherein the processing circuitry is configured to inform the plurality of member electronic apparatuses of configuration information of the BWP for multicast through RRC reconfiguration signaling.

Appendix 14. The managing electronic apparatus according to Appendix 13, wherein the processing circuitry is configured to:

receive a perception result from at least one member electronic apparatus among the plurality of member electronic apparatuses for time-frequency resource blocks on the BWP for multicast, and select, based on the perception result, a time-frequency resource pool used for the multicast communication.

Appendix 15. The managing electronic apparatus according to Appendix 14, wherein the processing circuitry is configured to receive a message that switching is successful on the BWP for multicast that is fed back via Sidelink Control Information, SCI, of the plurality of member electronic apparatuses, and to perform the multicast communication based on the message.

Appendix 16. The managing electronic apparatus according to any one of Appendixes 1 to 4, wherein at least one member electronic apparatus among the plurality of member electronic apparatuses is within coverage of a network side equipment that provides services thereto, and the managing electronic apparatus is not within the coverage of the network side equipment.

Appendix 17. The managing electronic apparatus according to Appendix 16, wherein the processing circuitry is configured to:

determine, as the BWP for multicast, a BWP resource used for the multicast communication that is selected by the managing electronic apparatus, and inform the plurality of member electronic apparatuses of configuration information of the BWP for multicast through RRC reconfiguration signaling.

Appendix 18. The managing electronic apparatus according to Appendix 17, wherein the processing circuitry is configured to:

receive a perception result from at least one member electronic apparatus among the plurality of member electronic apparatuses for time-frequency resource blocks on the BWP for multicast, and select, based on the perception result, a time-frequency resource pool used for the multicast communication.

Appendix 19. The managing electronic apparatus according to Appendix 18, wherein the processing circuitry is configured to:

receive a message that switching is successful on the BWP for multicast that is fed back via Sidelink Control Information, SCI, of the plurality of member electronic apparatuses, and perform the multicast communication before or after the at least one member electronic apparatus reports configuration information of the BWP for multicast to the network side equipment and receives feedback about successfully receiving the configuration information from the network side equipment.

Appendix 20. The managing electronic apparatus according to any one of Appendixes 5 to 19, wherein the processing circuitry is configured to:

activate a predetermined timer in a case of not performing the multicast communication on the initial BWP, and switch the BWP for multicast to the initial BWP if, within timing by the predetermined timer, the managing electronic apparatus sends no data and the plurality of member electronic apparatuses receive no data.

Appendix 21. The managing electronic apparatus according to any one of Appendixes 1 to 4, wherein the processing circuitry is configured to inform the predetermined pairs of member electronic apparatuses of configuration information of the BWP for unicast through RRC reconfiguration signaling.

Appendix 22. The managing electronic apparatus according to Appendix 21, wherein the processing circuitry is configured to receive a message that switching is successful on the BWP for unicast that is fed back via Sidelink Control Information, SCI, of the predetermined pairs of member electronic apparatuses.

Appendix 23. The managing electronic apparatus according to any one of Appendixes 21 to 22, wherein the processing circuitry is configured to:

activate a predetermined timer in a case where the unicast communication is not performed on the initial BWP, and switch the unicast BWP to the initial BWP if, within timing by the predetermined timer, the predetermined pairs of member electronic apparatuses do not receive/send data.

Appendix 24. The managing electronic apparatus according to any one of Appendixes 1 to 23, wherein the processing circuitry is configured to select the BWP resource in a scenario of sidelink communication.

Appendix 25. A member electronic apparatus for wireless communications, comprising:

processing circuitry configured to:

receive, from a managing electronic apparatus in a group to which the member electronic apparatus belongs, configuration information about a bandwidth part, BWP, for multicast and/or BWP for unicast determined from a plurality of BWPs, for multicast communication with the managing electronic apparatus based on the BWP for multicast, and/or unicast communication with other member electronic apparatuses in the group based on the BWP for unicast.

Appendix 26. The member electronic apparatus according to Appendix 25, wherein the plurality of BWPs are a first predetermined number of BWP sets, wherein each BWP set respectively includes the same initial BWP and a second predetermined number of BWPs differing from each other.

Appendix 27. The member electronic apparatus according to Appendix 26, wherein the processing circuitry is configured to receive configuration information of the first predetermined number of BWP sets, on the initial BWP, via Radio Resource Control, RRC, connection request signaling sent from the managing electronic apparatus.

Appendix 28. The member electronic apparatus according to Appendix 27, wherein the configuration information of the first predetermined number of BWP sets includes indicator information about the BWP sets and BWPs in each BWP set.

Appendix 29. The member electronic apparatus according to any one of Appendixes 25 to 28, wherein the processing circuitry is configured to receive configuration information of the BWP for multicast via Radio Resource Control, RRC, reconfiguration signaling sent from the managing electronic apparatus.

Appendix 30. The member electronic apparatus according to Appendix 29, wherein the processing circuitry is configured to:

compare the configuration information of the BWP for multicast with configuration information of a current BWP resource of the member electronic apparatus, switch the current BWP resource to the BWP for multicast if they are not the same, and maintain the current BWP resource if they are the same.

Appendix 31. The member electronic apparatus according to Appendix 30, wherein the processing circuitry is configured to report a perception result for time-frequency resource blocks on the BWP for multicast to the managing electronic apparatus, for the managing electronic apparatus to select, based on the perception result, a time-frequency resource block used for the multicast communication.

Appendix 32. The member electronic apparatus according to Appendix 31, wherein the processing circuitry is configured to feed back a message that switching is successful on the BWP for multicast, to the managing electronic apparatus, via Sidelink Control Information, SCI.

Appendix 33. The member electronic apparatus according to any one of Appendixes 25 to 32, wherein the member electronic apparatus is within coverage of a network side equipment that provides services thereto, and the managing electronic apparatus is not within the coverage of the network side equipment.

Appendix 34. The member electronic apparatus according to Appendix 33, wherein the processing circuitry is configured to report configuration information of the BWP for multicast to the network side equipment, and to receive information about successfully receiving feedback of configuration information from the network side equipment.

Appendix 35. The member electronic apparatus according to any one of Appendixes 25 to 32, wherein the processing circuitry is configured to:

send a request for the unicast communication to the managing electronic apparatus, and receive configuration information of the BWP for unicast through RRC reconfiguration signaling.

Appendix 36. The member electronic apparatus according to Appendix 35, wherein the member electronic apparatus is an electronic apparatus used for sending data in the unicast communication, and the processing circuitry is configured to:

receive a perception result from the other member electronic apparatuses for time-frequency resource blocks on the BWP for unicast, and select, based on the perception result, a time-frequency resource pool used for the unicast communication.

Appendix 37. The member electronic apparatus according to Appendix 35, wherein the member electronic apparatus is an electronic apparatus used for receiving data in the unicast communication, and the processing circuitry is configured to report a perception result for time-frequency resource blocks on the BWP for unicast to the other member electronic apparatuses, for the other member electronic apparatuses to select, based on the perception result, a time-frequency resource block used for the unicast communication.

Appendix 38. The member electronic apparatus according to any one of Appendixes 25 to 37, wherein the processing circuitry is configured to receive configuration information of the BWP for multicast and/or the BWP for unicast in a scenario of sidelink communication.

Appendix 39. A sending electronic apparatus for wireless communications, comprising:

processing circuitry configured to:

select a bandwidth part, BWP, resource from a plurality of BWPs, for unicast communication with a receiving electronic apparatus.

Appendix 40. The sending electronic apparatus according to Appendix 39, wherein the plurality of BWPs are a first predetermined number of BWP sets, wherein each BWP set respectively includes the same initial BWP and a second predetermined number of BWPs differing from each other.

Appendix 41. The sending electronic apparatus according to Appendix 40, wherein the processing circuitry is configured to inform, when the unicast communication is established, the receiving electronic apparatus of configuration information of the first predetermined number of BWP sets through Radio Resource Control, RRC, connection request signaling, on the initial BWP.

Appendix 42. The sending electronic apparatus according to Appendix 41, wherein the configuration information of the first predetermined number of BWP sets includes indicator information about the BWP sets and BWPs in each BWP set.

Appendix 43. The sending electronic apparatus according to any one of Appendixes 39 to 42, wherein the processing circuitry is configured to inform the receiving electronic apparatus of configuration information of the selected BWP through RRC reconfiguration signaling.

Appendix 44. The sending electronic apparatus according to Appendix 43, wherein the processing circuitry is configured to:

receive a perception result from the receiving electronic apparatus for time-frequency resource blocks on the selected BWP, and select, based on the perception result, a time-frequency resource pool used for the unicast communication.

Appendix 45. The sending electronic apparatus according to Appendix 44, wherein the processing circuitry is configured to receive a message that switching is successful on the selected BWP that is fed back via Sidelink Control Information, SCI, of the receiving electronic apparatus, and to perform the unicast communication based on the message.

Appendix 46. The sending electronic apparatus according to any one of Appendixes 39 to 45, wherein the processing circuitry is configured to:

activate a predetermined timer in a case of not performing the unicast communication on the initial BWP, and switch the selected BWP to the initial BWP if, within timing by the predetermined timer, the sending electronic apparatus sends no data and the receiving electronic apparatus receives no data.

Appendix 47. The sending electronic apparatus according to any one of Appendixes 39 to 46, wherein the processing circuitry is configured to select the BWP resource in a scenario of sidelink communication.

Appendix 48. A receiving electronic apparatus electronic apparatus for wireless communications, comprising:

processing circuitry configured to:

receive, from a sending electronic apparatus, configuration information about a selected bandwidth part, BWP, resource determined from a plurality of BWPs, for unicast communication with the sending electronic apparatus.

Appendix 49. The receiving electronic apparatus electronic apparatus according to Appendix 48, wherein the plurality of BWPs are a first predetermined number of BWP sets, wherein each BWP set respectively includes the same initial BWP and a second predetermined number of BWPs differing from each other.

Appendix 50. The receiving electronic apparatus electronic apparatus according to Appendix 49, wherein the processing circuitry is configured to receive configuration information of the first predetermined number of BWP sets, on the initial BWP, via Radio Resource Control, RRC, connection request signaling sent from the sending electronic apparatus.

Appendix 51. The receiving electronic apparatus electronic apparatus according to Appendix 50, wherein the configuration information of the first predetermined number of BWP sets includes indicator information about the BWP sets and BWPs in each BWP set.

Appendix 52. The receiving electronic apparatus electronic apparatus according to any one of Appendixes 48 to 51, wherein the processing circuitry is configured to receive configuration information of the selected BWP via Radio Resource Control, RRC, reconfiguration signaling sent from the sending electronic apparatus.

Appendix 53. The receiving electronic apparatus electronic apparatus according to Appendix 52, wherein the processing circuitry is configured to:

compare the configuration information of the selected BWP with configuration information of a current BWP resource of the receiving electronic apparatus, switch the current BWP resource to the selected BWP if they are not the same, and maintain the current BWP resource if they are the same.

Appendix 54. The receiving electronic apparatus electronic apparatus according to Appendix 53, wherein the processing circuitry is configured to report a perception result for time-frequency resource blocks on the selected BWP to the sending electronic apparatus, for the sending electronic apparatus to select, based on the perception result, a time-frequency resource block used for the unicast communication.

Appendix 55. The receiving electronic apparatus electronic apparatus according to Appendix 54, wherein the processing circuitry is configured to feed back a message that switching is successful on the selected BWP, to the sending electronic apparatus, via Sidelink Control Information, SCI.

Appendix 56. The receiving electronic apparatus electronic apparatus according to any one of Appendixes 48 to 55, wherein the processing circuitry is configured to receive the selected BWP resource in a scenario of sidelink communication.

Appendix 57. A method for wireless communications, the method executed by a managing electronic apparatus, the method comprising:

selecting a bandwidth part, BWP, resource from a plurality of BWPs, for determining a BWP for multicast which is used for multicast communication between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses.

Appendix 58. A method for wireless communications, the method executed by a member electronic apparatus, the method comprising:

receiving, from a managing electronic apparatus in a group to which the member electronic apparatus belongs, configuration information about a bandwidth part, BWP, for multicast and/or BWP for unicast determined from a plurality of BWPs, for multicast communication with the managing electronic apparatus based on the BWP for multicast, and/or unicast communication with other member electronic apparatuses in the group based on the BWP for unicast.

Appendix 59. A method for wireless communications, the method executed by a sending electronic apparatus, the method comprising:

selecting a bandwidth part, BWP, resource from a plurality of BWPs, for unicast communication with a receiving electronic apparatus.

Appendix 60. A method for wireless communications, the method executed by a receiving electronic apparatus, the method comprising:

receiving, from a sending electronic apparatus, configuration information about a selected bandwidth part, BWP resource determined from a plurality of BWPs, for unicast communication with the sending electronic apparatus.

Appendix 61. A computer readable storage medium storing computer executable instructions that, when executed, execute the method for wireless communications according to any one of Appendixes 57 to 60.

The invention claimed is:

1. A managing electronic apparatus for wireless communications, comprising:

at least one processor; and at least one memory including computer program code, where the at least one memory and the computer program code are configured, with the at least one processor, to cause the managing electronic apparatus to at least:

select a bandwidth part, BWP, resource from a plurality of BWPs, for determining a BWP for multicast which is used for multicast communication between the managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses, and receive indication information from a network side equipment through control signaling, the indication information indicating whether the managing electronic apparatus can independently determine the BWP for multicast, wherein the managing electronic apparatus is within coverage of the network side equipment that provides services thereto.

2. The managing electronic apparatus according to claim 1, wherein the plurality of BWPs are a first predetermined number of BWP sets, wherein each BWP set respectively includes the same initial BWP and a second predetermined number of BWPs differing from each other.

3. The managing electronic apparatus according to claim 2, wherein the at least one memory and the computer program code are configured, with the at least one processor, to cause the managing electronic apparatus to inform, under a condition where the group is established, the plurality of member electronic apparatuses of configuration information of the first predetermined number of BWP sets through Radio Resource Control, RRC, connection request signaling, on the initial BWP.

4. The managing electronic apparatus according to claim 3, wherein the configuration information of the first predetermined number of BWP sets includes indicator information about the BWP sets and BWPs in each BWP set.

5. The managing electronic apparatus according to claim 1, wherein the control signaling includes Downlink Control Information, DCI.

6. The managing electronic apparatus according to claim 1, wherein the at least one memory and the computer program code are configured, with the at least one processor, to cause the managing electronic apparatus to report, in a case where the indication information indicates that the managing electronic apparatus cannot independently determine the BWP for multicast, configuration information of a BWP resource used for the multicast communication that is selected by the managing electronic apparatus, and configuration information of at least one candidate BWP resource that can be used for the multicast communication in the plurality of BWPs, to the network side equipment.

7. The managing electronic apparatus according to claim 6, wherein the at least one memory and the computer program code are configured, with the at least one processor, to cause the managing electronic apparatus to perform the reporting through a Physical Uplink Shared Channel, PUSCH.

8. The managing electronic apparatus according to claim 6, wherein the at least one memory and the computer program code are configured, with the at least one processor, to cause the managing electronic apparatus to receive a fed back BWP resource fed back from the network side equipment, and to determine the fed back BWP resource as the BWP for multicast, wherein the fed back BWP resource is a BWP resource used for the multicast communication that is selected by the managing electronic apparatus, or a BWP resource that is selected by the network side equipment from the at least one candidate BWP resource.

9. The managing electronic apparatus according to claim 1, wherein the at least one memory and the computer program code are configured, with the at least one processor, to cause the managing electronic apparatus to determine, in a case where the indication information indicates that the managing electronic apparatus can independently determine the BWP for multicast, a BWP resource used for the multicast communication that is selected by the managing electronic apparatus, as the BWP for multicast.

10. The managing electronic apparatus according to claim 1, wherein the at least one memory and the computer program code are configured, with the at least one processor, to cause the managing electronic apparatus to inform the plurality of member electronic apparatuses of configuration information of the BWP for multicast through RRC reconfiguration signaling.

11. The managing electronic apparatus according to claim 1, wherein at least one member electronic apparatus among the plurality of member electronic apparatuses is within the coverage of the network side equipment that provides services thereto.

12. The managing electronic apparatus according to claim 11, wherein the at least one memory and the computer program code are configured, with the at least one processor, to cause the managing electronic apparatus to:

determine, as the BWP for multicast, a BWP resource used for the multicast communication that is selected by the managing electronic apparatus, and inform the plurality of member electronic apparatuses of configuration information of the BWP for multicast through RRC reconfiguration signaling.

13. The managing electronic apparatus according to claim 12, wherein the at least one memory and the computer program code are configured, with the at least one processor, to cause the managing electronic apparatus to:

receive a perception result from the at least one member electronic apparatus among the plurality of member electronic apparatuses for time-frequency resource blocks on the BWP for multicast, and select, based on the perception result, a time-frequency resource pool used for the multicast communication.

14. The managing electronic apparatus according to claim 13, wherein the at least one memory and the computer program code are configured, with the at least one processor, to cause the managing electronic apparatus to:

receive a message that switching is successful on the BWP for multicast that is fed back via Sidelink Control Information, SCI, of the plurality of member electronic apparatuses, and perform the multicast communication before or after the at least one member electronic apparatus reports configuration information of the BWP for multicast to the network side equipment and receives feedback about successfully receiving the configuration information from the network side equipment.

15. The managing electronic apparatus according to claim 1, wherein the at least one memory and the computer program code are configured, with the at least one processor, to cause the managing electronic apparatus to inform the predetermined pairs of member electronic apparatuses of configuration information of the BWP for unicast through RRC reconfiguration signaling.

16. The managing electronic apparatus according to claim 15, wherein the at least one memory and the computer program code are configured, with the at least one processor, to cause the managing electronic apparatus to receive a message that switching is successful on the BWP for unicast that is fed back via Sidelink Control Information, SCI, of the predetermined pairs of member electronic apparatuses.

17. A member electronic apparatus for wireless communications, comprising:

at least one processor; and at least one memory including computer program code, where the at least one memory and the computer program code are configured, with the at least one processor, to cause the member electronic apparatus to at least:

receive, from a managing electronic apparatus in a group to which the member electronic apparatus belongs, configuration information about a bandwidth part, BWP, for multicast and/or BWP for unicast determined from a plurality of BWPs, for multicast communication with the managing electronic apparatus based on the BWP for multicast, and/or unicast communication with other member electronic apparatuses in the group based on the BWP for unicast, and send indication information to the managing electronic apparatus, through control signaling the indication information indicating whether the managing electronic apparatus is able to independently determine the BWP for multicast, wherein the managing electronic apparatus is within coverage of a network side equipment that provides services thereto.

18. A system for wireless communications, comprising:

circuitry configured to select a bandwidth part, BWP, resource from a plurality of BWPs, for determining a BWP for multicast which is used for multicast communication between a managing electronic apparatus and a plurality of member electronic apparatuses in a group to which the managing electronic apparatus belongs and/or a BWP for unicast which is used for unicast communication between predetermined pairs of member electronic apparatuses in the plurality of member electronic apparatuses, and process indication information from a network side equipment through control signaling, the indication information indicating whether the managing electronic apparatus is able to independently determine the BWP for multicast, wherein the managing electronic apparatus is within coverage of a network side equipment that provides services thereto.

* * * * *